United States Patent [19]

Gill et al.

[11] Patent Number: 4,622,361
[45] Date of Patent: Nov. 11, 1986

[54] FLAME RETARDED HIGH MODULUS POLYURETHANE ELASTOMERS AND METHOD OF MAKING SAME

[75] Inventors: William A. Gill, Hurricane; Richard M. Gerkin, Cross Lanes, both of W. Va.

[73] Assignee: Union Carbide Corporation, Danbury, Conn.

[21] Appl. No.: 717,346

[22] Filed: Mar. 29, 1985

[51] Int. Cl.$^4$ ............................................. C08L 75/04
[52] U.S. Cl. .................................... 524/710; 524/712; 524/786; 524/789; 525/131; 525/455; 528/72; 528/74.5; 528/76; 528/77; 528/78; 528/79; 264/328.1; 264/328.6; 264/328.8
[58] Field of Search ............... 524/712, 710, 786, 789; 525/131, 455; 528/72, 74.5, 76, 77, 78, 79; 264/328.1, 328.6, 328.8

[56] References Cited

U.S. PATENT DOCUMENTS

| | | |
|---|---|---|
| 3,789,091 | 1/1974 | Anderson et al. . |
| 3,849,368 | 11/1974 | Anderson et al. . |
| 3,966,478 | 6/1976 | Toy et al. . |
| 4,125,505 | 11/1978 | Critchfield et al. ................. 525/131 |
| 4,162,276 | 7/1979 | Rim et al. . |
| 4,246,360 | 1/1981 | Brown et al. . |
| 4,273,881 | 6/1981 | Otten et al. . |
| 4,342,682 | 8/1982 | Halpern et al. . |
| 4,381,364 | 4/1983 | Georgacopoulos et al. . |
| 4,400,476 | 8/1983 | Bechara et al. . |
| 4,407,981 | 10/1983 | Aaronson et al. . |
| 4,536,557 | 8/1985 | Heyman ............................. 525/131 |

OTHER PUBLICATIONS

Antiblaze 19 Flame Retardant and Antiblaze 19T Flame Retardant, Product Information Bulletin, Bulletin No. FRB—3F, 5/20/76, Mobil Chemical Company, Phosphorous Division, Industrial Chemicals Group.
The Development of a RIM Processible Structural Foam System Containing Flame Retardants, Carleton, Pritchard and Alberinoe, Proceedings of the SPI, 26th Annual Technical Conference, Nov. 1-4, 1981, San Francisco, Calif.
Baydur 724 System Product Information Pamphlet.

*Primary Examiner*—Maurice J. Welsh
*Attorney, Agent, or Firm*—Paul W. Leuzzi

[57] ABSTRACT

A high modulus polyurethane elastomer having improved combustion resistance and satisfactory physical properties comprising the reaction product of a polyol or polymer polyol, a low molecular weight chain extender, a liquid organic polymeric isocyanate having an average functionality of at least about 2.4 and a defined concentration of flame retardant.

60 Claims, No Drawings

FLAME RETARDED HIGH MODULUS POLYURETHANE ELASTOMERS AND METHOD OF MAKING SAME

BACKGROUND OF THE INVENTION

1. Field Of The Invention

This invention relates to polyurethane elastomers having improved combustion resistance and to a method of preparing such elastomers.

2. Description Of The Prior Art

Urethane elastomers are a class of polymers which can be broadly defined as containing a relatively high molecular weight (i.e., >1000) polyol (or polymer/polyol), a low molecular weight chain extender and an isocyanate. Such elastomers can be fabricated by reaction injection molding (commonly termed "RIM") techniques. RIM polymers are based upon a distribution of hard and soft segments. The process for preparing these polymers is described in *Rubber Age*, volume 7, page 46, 1975. The hard segments (i.e., the reaction product of the isocyanate and low molecular weight extenders) provide the modulus requirements, while the soft segments (i.e., the polyol) provide the resiliency or flexibility characteristics. The respective materials or monomers employed contain the reactive moieties at or near the extreme ends of the molecule. Upon reaction, the molecules are linked end-to-end in a chain fashion.

Elastomeric polymers ranging from very low to very high modulus can be formulated by use of the wide variety of intermediates available and by controlling the ratio of polyol to chain extender plus isocyanate. Because of their excellent properties and performance characteristics, high modulus polyurethane elastomers are of particular interest for numerous applications including those relating to automotive fascia, structural enclosures for the electronics industry, appliance housings and the like. Unfilled elastomers typically used for automotive facia have a modulus up to about 80,000 psi or so. Elastomers for structural applications preferably have somewhat higher modulus, such as, for example, on the order of about 100,000 psi. The modulus may of course be significantly higher, on the order of 160,000 psi to about 200,000 psi or 240,000 psi or so and higher, depending on the particular application.

The use of reaction injection molded thermoset polyurethane elastomers provides certain advantages over injection molding of thermoplastic resins. For example, the thermoplastic injection molding process typically requires that the thermoplastic resin employed be melted and then injected into a mold. In order to insure that the void spaces throughout the mold are filled, the resin must be heated to a temperature sufficiently high to reduce its viscosity and thereby permit the resin to be injected into the mold. Even when this is done, it is usually necessary to employ high pressure molding equipment to inject the resin into the mold to produce items of satisfactory marketable quality. In contrast, the oligomeric components of the RIM system are of relatively lower molecular weight and viscosity and need not be heated to the same degree as thermoplastics prior to injection into a mold. Because the RIM components have low viscosity when injected and react in situ in the mold, the RIM polyurethane technique more faithfully fills the mold and reproduces mold detail better than injection molding with thermoplastic materials.

A further advantage of RIM polyurethane production is that capital costs associated with RIM equipment are lower than those associated with comparable thermoplastic molding equipment because the need for high pressure equipment required by the thermoplastic injection process is reduced. Similarly, the energy costs associated with the RIM process are much lower than those associated with thermoplastic molding because the degree of mold heating and cooling is much less than with thermoplastic molding equipment.

Despite these several processing and performance advantages of RIM urethane elastomers, such elastomers have not been commercially successful for many consumer and industrial applications for which flammability and combustion resistance standards are stringent. Such applications include appliance housings, such as, for example, air conditioners, refrigerators and the like, and for electronics applications such as, for example, housings for computers and the like.

Industry recognized combustion resistance and flammability requirements for plastic materials in general, including polyurethanes which are utilized in such applications, are extremely demanding. Such materials are subjected to and must pass a vertical burn test such as the vertical burn test established by Underwriter's Laboratories, Inc. which is well known to those skilled in the art. Materials are rated according to the requirements established by that test depending upon certain characteristics exhibited by the material when it is subjected to the test, including the ability of the plastic not to drip flaming particles and the ability of the plastic to burn at a slow rate or to self-extinguish. In order to qualify for certain electrical and electronic enclosure applications, it is necessary for the plastic material to exhibit a relatively short burn time and/or to be self-extinguishing within certain periods of time, and for certain ratings it must not drip flaming particles. Such enclosures, as well as other applications, represent a large potential market for RIM polyurethanes. However, certain RIM polyurethanes have not been commercially feasible for such applications because of their tendency to burn rapidly once ignited and to drip flaming particles.

While material density and the thickness of manufactured parts can be adjusted to improve flammability characteristics of polyurethane products, more significant improvements in flammability performance have been achieved by the incorporation of flame retardant additives. Significant reduction in the flammability of polyurethane compositions has been achieved by incorporation of known halogen and phosphorus flame retardant additives. Illustrative of the approach are:

Japanese Pat. No. 58,017,116 which discloses articles manufactured from a fire-retardant hard urethane usable as housings for various electrical applicances and household equipment; the articles are produced from a process mixing components comprising a foam stabilizer, polyisocyanate and a liquid mixture of active hydrogen compounds.

U.S. Pat. No. 3,849,368 which discloses polymer compositions with flame-retardant properties comprising thermally stable, cyclic phosphonate esters.

European Pat. No. 62,210 which discloses polyurethane elastomer compositions with flame-retardant properties comprising at least four additives comprising $Sb_2O_3$, halogen compounds, alumina trihydrate, phosphate triester and optionally quaternary tetraalkyl ammonium salts.

U.S. Pat. No. 4,407,981 which discloses polyurethane compositions with flame-retardant properties comprising a dialkyl alkylphosphate and an organochlorine or organobromine compound.

U.S. Pat. No. 3,966,478 which discloses polyurethane compositions with flame-retardant properties comprising a haloalkyl phosphoramidate flame-retardant additive.

U.S. Pat. No. 4,273,881 which discloses polyurethane foams with flame-retardant properties; chlorinated phosphorus compounds such as bis-(2-chloroethyl)-2-chloroethyl phosphonate are incorporated as flame-retardant additives.

Approaches to reduce dripping and impart flame-retardancy include:

U.S. Pat. No. 4,342,682 which discloses polyurethane elastomers with flame-retardant and anti-drip properties comprising melammonium pentate and/or a pentate salt of ammelide as a bubbling agent to form a non-burning char.

U.S. Pat. No. 4,381,364 which discloses flame-retardant polyurethanes which produce char and fail to drip on combustion; the composition comprises a thermoplastic polyurethane, polyvinyl chloride, a polyacrylonitrile/polybutadiene copolymer, $Sb_2O_3$ and a halogenated aromatic compound.

U.S. Pat. No. 4,162,276 which discloses polyurethane elastomer compositions with non-drip flame-retardant properties; the compositions comprise hexa-alkoxymethyl-melamine, organic halogen compounds and phosphorus substituted phosphocyclopentene oxide.

The use of flame retardant additives does not necessarily provide a satisfactory solution to the problem of flaming particle dripping. Moreover, the addition of flame retardants at the typically large quantities heretofore used in the polyurethane art, especially for foam applications, to achieve the desired flammability characteristics would be expected to adversely affect the modulus of a polyurethane elastomer. it is believed that many of the flame retardant additives commonly known and used exert a plasticizing effect when added to resins in the large amounts typically required to adequately flame retard the polyurethane product. Such an effect can be especially deleterious to the modulus of a high modulus RIM polyurethane elastomer.

Thus, despite the widespread effort to impart flammability resistance characteristics to polyurethane products to meet industry flammability standards, there still remains a need to provide high modulus polyurethane elastomers which do not drip flaming particles when exposed to a flame and which burn at a sufficiently slow rate to satisfy existing vertical burn test criteria, and yet maintain satisfactory processibility in the RIM technique and have satisfactory physical properties.

OBJECTS OF THE INVENTION

It is accordingly a primary object of the present invention to provide high modulus polyurethane elastomers with superior flame retardant properties, such that they exhibit improved combustion resistance. It is a related object to provide polyurethane elastomers which do not drip flaming particles when exposed to a flame or ignited.

It is a further object of this invention to provide flame retarded high modulus polyurethane elastomers possessing adequate physical properties capable of satisfying the specifications for many diverse applications.

Another object of this invention is to provide high modulus polyurethane elastomers with an amount of flame retardant additive sufficient to provide elastomers with improved combustion resistance economically and without significantly adversely affecting elastomer physical properties.

Yet another object of this invention lies in the provision of reaction injection molded polyurethane elastomers having superior flame retardant properties and having physical properties capable of satisfying the specifications for many diverse applications.

Other objects and advantages of the present invention will become apparent from the following detailed description.

SUMMARY OF THE INVENTION

In general, the present invention is predicated on the discovery that high modulus polyurethane elastomers having improved flammability and combustion resistance and satisfactory physical properties can be provided by appropriate selection of (a) properly defined reactive intermediates, and (b) a minor but sufficient amount of a flame retardant additive. The novel flame retarded polyurethane elastomers of the present invention are characterized by a non-drip flammability property, short or zero flaming combustion times and generally self-extinguishing capabilities.

DETAILED DESCRIPTION OF THE INVENTION AND PREFERRED EMBODIMENTS

Description Of Polyurethane Elastomers

Generally, the polyurethane elastomers of the present invention are polymers which can be broadly defined as containing a relatively high molecular weight (i.e., >1000) polyol, or more preferably, a polymer/polyol, a low molecular weight chain extender and an isocyanate. The polyurethane is composed of a distribution of hard and soft segments. The hard segments, which comprise the reaction product of the isocyanate and low molecular weight extenders, provide the modulus requirements, while the soft segments, i.e., the polyol or polyol portion of the polymer/polyol, provide the resiliency or flexibility characteristics.

The elastomers of the present invention generally include from about 25 to about 60% by weight of the soft segment and from about 40 to about 75% by weight of the hard segment. The relative amount of soft and hard segments will, of course, depend upon the particular application, and its requirements, that is, the modulus required. The elastomer may have a modulus of at least about 100,000 psi or so, preferably a modulus of at least about 160,000 psi or so, and most preferably, a modulus of from about 200,000 to about 240,000 psi or somewhat higher.

The combustion resistance of the polyurethane elastomers in accordance with the present invention is evaluated by a vertical burn test. In accordance with that test, an elastomer test sample measuring 5.0 inches in length, 0.50 inch in width and having a maximum thickness of 0.50 inch is suspended vertically and exposed two consecutive times to a Bunsen burner flame. The first flame exposure is for ten (10) seconds. When flaming, if any, of the test sample ceases, the test sample is immediately placed under the flame a second time, again for ten (10) seconds. The duration of flaming and glowing is noted for each exposure. Five test samples are tested. The burn performance of the elastomer may then be evaluated according to various criteria, including whether the material drips flaming particles at the flame front, total burn length and total burn time.

The most stringent criteria require that no test sample may burn more than ten (10) seconds after two exposures, that total flaming combustion must not exceed fifty (50) seconds for ten exposures of five test samples, that no test sample may burn its entire length up to the holding clamp and that no test sample may drip flaming particles. Intermediate criteria include the requirements of the most stringent criteria except that test samples may burn for up to thirty (30) seconds after either the first or second exposure and total flaming combustion time may not exceed two hundred fifty (250) seconds. The least stringent criteria include the requirements of the intermediate criteria except that test samples are permitted to drip flaming particles that burn briefly.

In accordance with one aspect of the present invention, it has been found that a high modulus polyurethane elastomer that does not drip flaming particles at the flame front can be provided by appropriate selection of the isocyanate employed in the preparation of the elastomer. More particularly, an isocyanate of high average functionality, that is, at least about 2.4, should be used. It has been found that increasing the average functionality of the isocyanate essentially eliminates the dripping of flaming particles at the flame front, thereby imparting anti-dripping or non-drip characteristics to the elastomer; and further, it significantly reduces the burn rate, that is, the total time a sample burns before it is consumed is increased.

It is believed that the overall crosslink density of the elastomer is operative in achieving non-drip performance. Generally, the higher the average crosslink density of the elastomer, the greater is the tendency of the elastomer to exhibit non-drip performance. The crosslink density is not particularly critical, but must be sufficiently high such that the elastomer has the desired non-drip characteristics.

A sufficiently high average crosslink density of the elastomer can be achieved in several ways. For example, for a given chain extender and chain extender concentration, the isocyanate average functionality may be increased. Alternatively, a higher functionality chain extender may be used. As a further example, a higher level of chain extender may be used, which requires an increase in the level of isocyanate used in order to maintain the proper isocyanate/chain extender stoichiometry which results in increased crosslink density. As noted above, a high average functionality isocyanate is preferably used in order to more readily achieve the desired crosslink density and thus non-drip performance characteristics. Similarly, when a higher modulus is desired and the amount of chain extender used is increased, it is likewise preferable to utilize a high average functionality isocyanate to impart non-drip characteristics to the elastomer. A further advantage of providing a high crosslink density elastomer appears to be a reduction in the burn rate.

While an elastomer prepared using a sufficiently high average functionality isocyanate will exhibit non-drip performance characteristics and thus provide an elastomer which satisfies, in part, the combustion resistance standards of the vertical burn test, the elastomer may not be entirely satisfactory because it will not meet the burn time criteria established by the vertical burn test, that is, burn time may be too long. Accordingly, to meet the burn time criteria, it is preferable to include a suitable flame retardant (or mixtures thereof) in the elastomer.

In accordance with another aspect of the present invention, it has been found, unexpectedly, that the relationship between elastomer burn time and flame retardant additive concentration is generally a sinusoidal-like one, such that, for a flame retardant or flame retardant mixture, there is at least one flame retardant concentration range where burn time exhibits a characteristic local minimum. More particularly, it has been observed that use of a small concentration of flame retardant results in an initial decrease in burn time and subsequent incremental increases likewise results in further decreases until burn time reaches a local minimum, which may, but need not be a burn time of zero. Unexpectedly, it has been observed that, at relatively low levels of flame retardant, after the burn time local minimum has been achieved, increases in flame retardant concentration actually result in an increase in burn time. Burn time continues to increase until a local maximum is achieved, and thereafter again decreases proportional to increasing levels of flame retardant. At a sufficiently high level of flame retardant, a local minimum burn time is again observed.

The relatively low concentration range of flame retardant at which the burn time of the elastomer is sufficiently short that the intermediate burn time criteria are satisfied, which may include a burn time of zero or self-extinguishment, provides the desired operative flame retardant concentration range for use in the elastomer of the present invention. This level is referred to herein as the modal minimum flame retardant concentration.

Conceptually, the modal minimum flame retardant concentration can be viewed as a continuous concentration range circumscribed by three points. The central or second point is the local minimum where burn time is shortest, often zero. The first point is the lowest concentration of flame retardant at which the elastomer burn time first exhibits the intermediate criteria. The third point is the flame retardant concentration at which the elastomer burn time exhibits the intermediate criteria before burn time reaches the local maximum. Stated another way, the modal minimum flame retardant concentration for a given flame retardant (or flame retardant mixture) for a given elastomer is the concentration range of flame retardant which, when included in the elastomer, will provide an elastomer characterized by a total burn time, for two (2) flame exposures of five (5) test samples, which does not exceed 250 seconds. It will be appreciated that satisfactory burn characteristics will be provided so long as the flame retardant concentration is within the modal minimum, whether the actual concentration used is greater or less than the concentration which provides the local minimum.

Inclusion of the flame retardant within the modal minimum flame retardant concentration range will thus impart the desired flammability resistance to the elastomer, and, at the same time, the physical properties of the elastomer will not be appreciably adversely affected. In contrast, at flame retardant concentrations above the modal minimum even though burn time may be satisfactory, the physical properties of the high modulus elastomers of the present invention typically deteriorate. The modal minimum flame retardant concentration is not an absolute concentration or concentration range, but varies as will be described more fully hereinafter.

Utilization of a high functionality isocyanate and a flame retardant at the modal minimum flame retardant concentration provides a high modulus polyurethane elastomer characterized by satisfactory physical properties and which exhibits outstanding flammability and combustion resistance characteristics. Moreover, the modulus of the polyurethane elastomer can be tailored to the desired particular end use application while still retaining improved flammability and combustion resistance characteristics.

Polyols And Polymer/Polyols

In the practice of the present invention, the soft segment of the elastomer may be provided by a polyol, the polyol portion of a polymer/polyol, or a blend of polyol and polymer/polyol.

The exact polyol, or blend or mixture thereof, employed as the base polyol in the preparation of the polyurethane elastomer or of the polymer/polyols capable of being used in the practice of the present invention depends upon the end use of the polyurethane product to be produced. The hydroxyl number of the polyol or polyols employed can accordingly vary over a wide range. For elastomer applications, it will generally be desirable to utilize relatively high molecular-weight base polyols having relatively low hydroxyl numbers, e.g., 20 to 60 or so. Such limits are not intended to be restrictive, but are merely illustrative of the large number of possible combinations for the polyol or polyols that can be used.

The hydroxyl number is defined as the number of milligrams of potassium hydroxide required for the complete hydrolysis of the fully phthalated derivative prepared from one gram of polyol. The hydroxyl number can also be defined by the equation:

$$OH = (56.1 \times 1000 \times f)/m.w.$$

where
OH = hydroxyl number of the polyol
f = functionality, that is, average number of hydroxyl groups per molecule of polyol
m.w. = number average molecular weight of the polyol.

Substantially any of the polyols previously used in the art to make elastomers or to make polymer/polyols can be used as the base polyol. Illustrative of suitable polyols are the polyhydroxyalkanes, the polyoxyalkylene polyols, or the like. Among the polyols which can be employed are those selected from one or more of the following classes of compositions, alone or in admixture, known to those skilled in the polyurethane art:
(a) alkylene oxide adducts of polyhydroxyalkanes;
(b) alkylene oxide adducts of nonreducing sugars and sugar derivatives;
(c) alkylene oxide adducts of phosphorus and polyphosphorus acids;
(d) alkylene oxide adducts of polyphenols;
(e) the polyols from natural oils such as castor oil, and the like.

Illustrative alkylene oxide adducts of polyhydroxyalkanes include, among others, the alkylene oxide adducts of ethylene glycol, propylene glycol, 1,3-dihydroxypropane, 1,3-dihydroxybutane, 1,4-dihydroxybutane, 1,4-, 1,5- and 1,6-dihydroxyhexane, 1,2-, 1,3-, 1,4-, 1,5-, 1,6-, 1,7- and 1,8-dihydroxyoctane, 1,10-dihydroxydecane, glycerol, 1,2,4-dihydroxybutane, 1,2,6-trihydroxyhexane, 1,1,1-trimethylolethane, 1,1,1-trimethylolpropane, pentaerythritol, polycaprolactone, xylitol, arabitol, sorbitol, mannitol, and the like.

A further class of polyols which can be employed are the alkylene oxide adducts of the nonreducing sugars, wherein the alkylene oxides have from 2 to 4 carbon atoms. Among the nonreducing sugars and sugar derivatives contemplated are sucrose, alkyl glycosides such as methyl glucoside, ethyl glucoside, and the like, glycol glycosides such as ethylene glycol glucoside, propylene glycol glycoside, glycerol glucoside, 1,2,6-hexanetriol glucoside, and the like, as well as the alkylene oxide adducts of the alkyl glycosides as set forth in U.S. Pat. No. 3,073,788.

A still further useful class of polyols is the polyphenols, and preferably the alkylene oxide adducts thereof wherein the alkylene oxides have from 2 to 4 carbon atoms. Among the polyphenols which are contemplated are, for example, bisphenol A, bisphenol F, condensation products of phenol and formaldehyde, and novolac resins; condensation products of various phenolic compounds and acrolein; the simplest member of this class being 1,2,3-tris(hydroxyphenyl)propanes, condensation products of various phenolic compounds and glyoxal, glutaraldehyde, and other dialdehydes, the simplest members of this class being the 1,1,2,2-tetrakis(hydroxyphenol)ethanes, and the like.

The alkylene oxide adducts of phosphorus and polyphosphorus acids are another useful class of polyols. Ethylene oxide, 1,2-epoxypropane, the epoxybutanes, 3-chloro-1,2-epoxypropane, and the like are preferred alkylene oxides. Phosphoric acid, phosphorus acid, the polyphosphoric acids such as tripolyphosphoric acid, the polymetaphosphoric acids, and the like are desirable for use in this connection.

Additional base polyols that are useful are those described in U.S. Pat. No. 4,226,756 to Critchfield et al. Such polyols are poly(oxypropylene-oxyethylene)-polyols of high ethylene oxide content. Conceptually, a portion of the ethylene oxide is present as a cap; and the remainder is distributed internally in the polyol chain. Such polyols can tolerate incompatible amounts of a low molecular weight chain extender, such as ethylene glycol and the like without creating processing problems because the resulting mixture exhibits self-emulsifying properties. Such polyols preferably have a hydroxyl number of from about 20 to about 60, an oxyethylene cap of from about 10 to 30 weight percent and an internal oxyethylene content of from about 5 to about 60 weight percent. Satisfactory compatibility and modulus enhancement are provided by utilizing polymer/polyols formed using such polyols.

Amine terminated poly(oxyalkylene)polyols such as described in U.S. Pat. No. 4,286,074, may likewise be used.

It is preferable to use polymer/polyols to incorporate modulus into the polyurethane. As is known, polymer/polyols may be prepared by polymerizing ethylenically unsaturated monomer or monomers in situ in a polyol.

Any ethylenically unsaturated monomer may be used, and useful monomers are described in various prior patents, including U.S. Pat. Nos. Re. 28,715 and 29,118 to Stamberger. Acrylonitrile, with or without a comonomer or comonomers, such as, for example, styrene, or methylmethacrylate will provide a suitable system. Acrylonitrile is preferred. The particular monomer system employed will be dependent upon the product characteristics desired in the resulting polyurethane product.

The polymer content of the polymer/polyol may vary within wide limits, again depending upon the requirements of the end use application. Thus, satisfactory property enhancement may be achieved using as little as about 5% by weight or so. On the other hand, it may be necessary or desirable to utilize polymer contents as large as can be employed to make a stable product, in which case the polymer content may well be up to 60% or even higher.

It should also be appreciated that the polymer/polyol may be blended with any desired polyol, suitable polyols being described above and in the above-identified Stamberger patents, to reduce the polymer content to the required level for the particular application. Preferred base polyols as noted above will generally have a hydroxyl number in the range of from about 20 to about 60 or so, depending upon the particular application. Blending may be useful when relatively low amounts of polymer content (e.g., about 10% or less) are needed due to the economic penalty involved in forming polymer/polyols with such relatively low polymer content initially.

The techniques for preparing polymer/polyols are well known, and any known technique may be employed. The polymer/polyols of the present invention may thus be produced by utilizing the process set forth in U.S. Pat. No. 4,208,314 to Priest et al. In accordance with that process, a low monomer-to-polyol ratio is maintained throughout the reaction mixture during the process. This is achieved by employing process conditions that provide rapid conversion of monomer to polymer. In practice, a low monomer-to-polyol ratio is maintained, in the case of semi-batch and continuous operation, by control of the temperature and mixing conditions, and, in the case of semi-batch operation, also by slowly adding the monomers to the polyol.

The temperature range is not critical and may vary from about 25° C. to about 140° C. or perhaps greater. The temperature should be selected so that the catalyst has a reasonable rate of decomposition with respect to the residence time in the reactor for a continuous flow reactor or the feed time for a semi-batch reactor.

The mixing conditions employed are those attained using a back-mixed reactor (e.g., a stirred flask or stirred autoclave). Reactors of this type keep the reaction mixture relatively homogeneous and so prevent localized high monomer-to-polyol ratios such as occur in certain tubular reactors, (e.g., the first stages of "Marco" reactors when such reactors are operated with all the monomer added to the first stage).

Other processing technology is disclosed in the prior art and may likewise be used in the preparation of the polymer/polyol. For example, the techniques set forth in U.S. Pat. No. 4,119,586 to Shah may be employed, if desired. The use of stabilizers is likewise contemplated.

Polyisocyanates

The polyisocyanates that are useful in producing high modulus polyurethane elastomers in accordance with this invention are liquid organic polymeric isocyanates of high average functionality. Conceptually, any sufficiently high average functionality isocyanate may be employed, the particular average functionality not being critical, provided that it will confer to the resulting elastomer non-dripping characteristics when the elastomer is subjected to the vertical burn test. Generally, the average functionality of the isocyanate must be sufficiently high so as to increase the crosslink density of the elastomer. Average isocyanate functionalities of as low as about 2.4 or so have been found suitable. To provide further improvement in the non-drip characteristics of the elastomer, it is preferable to utilize even higher average functionality isocyanates than the minimum set forth. To this end, the average functionality of the isocyanate preferably should be at least about 2.5, average isocyanate functionalities of about 2.7 to 2.8 or so having been found useful.

High functionality liquid polymeric isocyanates are well known in the polyurethane art. Suitable polymeric isocyanates include, for example, polymethylene poly(phenylene isocyanates) having the formula:

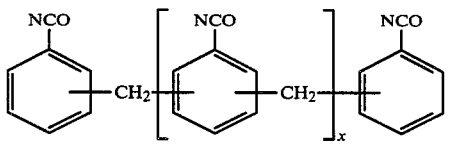

wherein x has an average value of at least 0.4, preferably from 0.4 to about 0.8. The most preferred polymeric polyisocyanate is a 2.8 average functionality polymeric isocyanate having the formula described above.

The use of a blend or mixture of a high functionality polymeric isocyanate and other isocyanates, including di- and/or modified isocyanates as well as isocyanate prepolymers is likewise contemplated.

Illustrative examples of isocyanates which may be blended or mixed with the high average functionality polymeric isocyanates described above include modified MDI-type isocyanates such as those described in U.S. Pat. No. 3,384,658, 1,2-diisocyanatoethane, 1,3-diisocyanatopropane, 1,2-diisocyanatopropane, 1,4-diisocyanatobutane, 1,5-diisocyanatopentane, 1,6-diisocyanatohexane, bis(3-isocyanatopropyl)ether, bis(3-isocyanatopropyl)sulfide, 1,7-diisocyanatoheptane, 1,5-diisocyanato-2,2-dimethylpentane, 1,6-diisocyanato-3-methoxyhexane, 1,8-diisocyanatooctane, 1,5-diisocyanato-2,2,4-trimethylpentane, 1,9-diisocyanatononane, 1,10-diisocyanatodecane, 1,11-diisocyanatoundecane, 1,12-diisocyanatododecane, bis-(isocyanatohexyl)sulfide, 1,4-diisocyanatobenzene, 2,4-diisocyanatotolylene, 2,6-diisocyanatotolylene, 2,4-diisocyanato-1-chlorobenzene, 2,4-diisocyanato-1-nitrobenzene, and 2,5-diisocyanato-1-nitrobenzene and mixtures thereof. Still other useful examples include 4,4'-diphenylmethane diisocyanate, 1,5-naphthalene diisocyanate, isophorone diisocyanate (IPDI) and 1,4-xylene diisocyanate.

Chain Extenders

Any of the known low molecular weight chain extenders may be utilized in producing polyurethane elastomers in accordance with this invention. Suitable chain extenders include low molecular weight glycol-based compounds. Generally, such compounds have a molecular weight less than about 200 grams/mole but may be somewhat higher. Exemplary low molecular weight glycol-based chain extenders include 1,4-butanediol; 1,6-hexanediol; 1,5-pentanediol; 1,3-propanediol and diethylene glycol. Ethylene glycol is preferred.

Conventional low molecular weight alkanolamines may likewise be suitably employed as chain extenders. Typical alkanolamines include N-(2-hydroxyethyl)piperazine, monoethanolamine methyldiethanolamine, and the like. Diamine chain extenders, such as, for example, diethyltoluene diamine are also useful for producing polyurethanes within the scope of the invention.

Catalyst

Any catalyst capable of catalyzing the reaction of the polyol (or polymer/polyol), and the low molecular weight chain extender with the isocyanate may be employed.

Catalysts that are useful in producing polyurethane elastomers in accordance with this invention include: (a) tertiary amines such as bis(dimethylaminoethyl)ether, trimethylamine, triethylamine, N-methylmorpholine, N-ethylmorpholine, N,N-dimethylbenzylamine, N,N-dimethylethanolamine, N,N,N',N'-tetramethyl-1,3-butanediamine, triethanolamine, 1,4-diazabicyclo[2.2.2]octane, pyridine oxide and the like; (b) tertiary phosphines such as trialkylphosphines, dialkylbenzylphosphines, and the like; (c) strong bases such as alkali and alkaline earth metal hydroxides, alkoxides, and phenoxides; (d) acidic metal salts of strong acids such as ferric chloride, stannic chloride, stannous chloride, antimony trichloride, bismuth nitrate and chloride, and the like; (e) chelates of various metals such as those which can be obtained from acetylacetone, benzoylacetone, trifluoroacetylacetone, ethyl acetoacetate, salicylaldehyde, cyclopentanone-2-carboxylate, acetylacetoneimine, bis-acetylacetone-alkylene-diimines, salicylaldehydeimine, and the like, with the various metals such as Be, Mg, Zn, Cd, Pb, Ti, Zr, Sn, As, Bi, Cr, Mo, Mn, Fe, Co, Ni, or such ions as $MoO_2++$, $UO_2++$, and the like; (f) alcoholates and phenolates of various metals such as $Ti(OR)_4$, $Sn(OR)_4$, $Sn(OR)_2$, $Al(OR)_3$, and the like, wherein R is alkyl or aryl, and the reaction products of alcoholates with carboxylic acids, betadiketones, and 2(N,N-dialkylamino)alkanols, such as the well known chelates of titanium obtained by said or equivalent procedures; (g) salts of organic acids with a variety of metals such as alkali metals, alkaline earth metals, Al, Sn, Pb, Mn, Co, Bi, and Cu, including, for example, sodium acetate, potassium laurate, calcium hexanoate, stannous acetate, stannous octoate, stannous oleate, lead octoate, metallic driers such as manganese and cobalt naphthenate, and the like; (h) organometallic derivatives of tetravalent tin, trivalent and pentavalent As, Sb, and Bi, and metal carbonyls of iron and cobalt.

Among the organotin compounds that deserve particular mention are dialkyltin salts of carboxylic acids, e.g., dibutyltin diacetate, dibutyltin dilaurate, dibutyltin maleate, dilauryltin diacetate, dioctyltin diacetate, dibutyltin-bis(4-methylaminobenzoate), dibutyltin-bis(6-methylaminocaproate), and the like. Dialkyltin mercaptides may also be utilized. Similarly, there may be used a trialkyltin hydroxide, dialkyltin oxide, dialkyltin dialkoxide, or dialkyltin dichloride. Examples of these compounds include trimethyltin hydroxide, tributyltin hydroxide, trioctyltin hydroxide, dibutyltin oxide, dioctyltin oxide, dilauryltin oxide, dibutyltin-bis(isopropoxide), dibutyltin-bis(2-dimethylaminopentylate), dibutyltin dichloride, dioctyltin dichloride, and the like.

The tertiary amines may be used as primary catalysts for accelerating the reactive hydrogen-isocyanate reaction or as secondary catalysts in combination with one or more of the above-noted metal catalysts. Metal catalysts, or combinations of metal catalysts, may also be employed as the accelerating agents, without the use of amines. The catalysts are employed in small amounts, for example, from about 0.001 percent to about 5 percent, based on the weight of the reaction mixture.

Flame Retardant Additives

As described above, it is desirable to include in the elastomer a flame retardant additive in order to impart combustion resistant or self-extinguishing characteristics to the elastomer. Inclusion of a flame retardant (or a mixture of flame retardants) at the modal minimum flame retardant concentration imparts the desired combustion resistance to the elastomer without appreciably adversely affecting its physical properties.

Formulating elastomers utilizing the modal minimum flame retardant concentration further provides unique cost and performance advantages. Generally, costs can be reduced by utilizing a lesser amount of flame retardant additive than has heretofore been contemplated. Second, the use of lower amounts of flame retardant additive may minimize any plasticizing effect which would otherwise adversely affect the physical properties of the elastomer.

Flame retardant compounds suitable for use in the present invention are of two general types, additive and reactive. Reactive flame retardants are incorporated into the host resin and actually become a part of the polymer chain. Additive flame retardants, on the other hand, do not form chemical bonds with the host resin and can be considered as either fillers or plasticizers.

The modal minimum flame retardant concentration to be used in accordance with the present invention to impart the desired combustion resistance to the elastomer is not a fixed amount. The modal minimum flame retardant concentration will vary depending upon various factors which may affect the combustion resistance of the elastomer. Principle among these are, the elastomer composition, the particular flame retardant or combination of flame retardants used, and the presence or absence of fillers and the like. For example, the degree of crosslinking in the elastomer would be expected to affect the modal minimum. At a higher degree of crosslinking in the elastomer it would be expected that the modal minimum would broaden and encompass lower levels of flame retardant. Conversely, as the elastomer becomes more linear, that is, the degree of crosslinking decreases, the modal minimum would be expected to become more constricted, i.e., narrower, and the required concentration of flame retardant may change. As a further example, it has been found that a greater amount of flame retardant additive should be used in the presence of fillers. The modal minimum flame retardant concentration, however is characteristic for any given set of conditions, and consistent with the teaching herein, can be readily ascertained by one of ordinary skill in the art.

As set forth above, the modal minimum flame retardant concentration for a given elastomer and flame retardant will be apparent from the burn time characteristics of the elastomer. The modal minimum is achieved at a relatively low level of flame retardant when the total burn time of the elastomer, for two flame exposures of five test samples, does not exceed 250 seconds. For example, it has been found that in an unfilled high modulus (about 200,000 psi) elastomer, the modal minimum concentration for chlorine-phosphorus-containing flame retardants is generally from about 1% to about 9% by weight of the elastomer. Illustrative modal minimum flame retardant concentrations for several phosphorus-chlorine flame retardants for an unfilled 210,000 psi modulus elastomer having a specific gravity of about 1.0, and 0.250 inch thick prepared using a polymeric isocyanate having a functionality of 2.8 are: for tetrakis(2-chloroethyl)ethylene diphosphate, 1.5 to 2.5 wt.%; for tris(betachloroethyl phosphate), 1.5 to 3.5 wt.%; for tri(chloroethyl)phosphonate, 3.0 to 9.0 wt.%; and for a chlorinated phosphonate ester containing 11 wt.% phosphorus and 35 wt.% chlorine (which is commercially available as Phosgard 2XC-20), 1.5 to about 3.5 wt.%. If, for example, the same elastomer (with the corresponding flame retardant) contains a glass filler, the modal minimum in each instance would be observed, but it would be expected to be at a somewhat higher flame retardant concentration.

It has been found that flame retardants which contain halogen or phosphorus or both are suitable. As is known such flame retardants are capable of operating through two basic mechanisms. The halogens are effective predominantly in the vapor phase of a fire by interrupting the generation of highly reactive free radicals that decompose the polymer. Other elements such as phosphorus (or boron) are effective in the condensed or solid phase and form a char that minimizes the availability of fresh fuel. The effectiveness of a particular compound depends not only on the elements present but also on the position of the elements in the molecule.

Compounds containing both halogen and phosphorus or blends of compounds containing either phosphorus or halogen are preferred, insofar as they tend to provide the best flame retardant results. These compounds are: all of the additive type; are liquids at room temperature; and will act as plasticizers in an elastomer formulation. For this reason, a low use level is desirable. The presence of both phosphorus and halogen in these compounds offers the two distinct flame retarding mechanisms described above. Suitable compounds include tri(chloroethyl)phosphonate, chlorinated phosphonate ester containing 11 wt. % phosphorus and 35 wt. % chlorine, tetrakis (2-chloroethyl)ethylene diphosphate, tris(betachloroethyl)phosphate, tris(chloroethyl)phosphate, and phosphorus chlorine containing oligomers.

Other flame retardant compounds may also be used. Such compounds are included at the modal minimum flame retardant concentration. These compounds may be in the class of either reactive or additive flame retardant additives and include:

non-halogenated phosphorus compounds such as phosphorus polyols, cyclic phosphorus esters and alkyl-halogen-free esters of phosphorus acids having the formula:

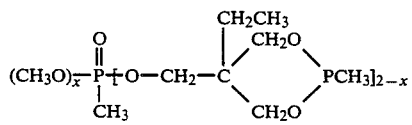

where x=0 or 1 (The latter compounds are more particularly described in U.S. Pat. No. 3,849,368.)

non-phosphorus chlorine compounds such as chlorinated paraffins and chlorinated monofunctional alkanols;

combined bromine-chlorine compounds such as brominated-chlorinated paraffins;

non-phosphorus bromine compounds such as pentabromodiphenyl oxides, brominated polyester polyols, decabromodiphenyl oxide, tribromoethyl benzene, ethylene-bis-tetra bromophthalimide and 2,3-dibromopropanol.

Other flame retardant compounds useful in the present invention include flame retardant fillers such as alumina trihydrate and certain bromine compounds such as antimony pentoxide/polyol blends.

Other Additives

If desired, other additives can be employed in minor amounts in producing the polyurethane elastomers in accordance with this invention. Illustrative of such additives that can be employed are: dyes, pigments, anti-oxidation agents, silicone surfactants and the like.

RIM Applications

In general, the RIM process comprises mixing the various components of the formulation together, injecting the mixed components under pressure into a mold cavity heated to the temperature appropriate for the particular system and product involved, and then removing (often termed "demolding") the molded product (i.e., part) from the cavity. The residence period in the mold, i.e., the demolding time, is selected such that the part has developed adequate green strength to allow removal without distortion of the part or the like resulting. Typical demolding times are 60 seconds or so. Improvements in productivity can result when shorter demolding times are employed while still achieving a tolerable rejection rate. The various process parameters are specified for individual systems, as is known.

Typically, the components of the formulation are fed into the mixing chamber in two streams. One stream comprises the polyol, the chain extender, the catalyst and optionally the flame retardant and other additives, while the other stream comprises the polymeric isocyanate or isocyanate blend of choice and optionally the flame retardant. Other optional ingredients, such as a blowing agent to aid in insuring that the mold cavity is filled, or reinforcing aids such as glass filler or the like, can also be included, the latter generally being added with the polyol feed stream.

The particular components that may be used in the formulation are known and are generally selected on the basis of the particular performance requirements for the end use application. Useful components are known to those skilled in the art. It is generally desirable to employ the polymeric isocyanate (or blend), chain extender and polyol or polymer/polyol described to provide a high modulus elastomer.

Definitions And Procedures

As used in the examples appearing below, the following designations, symbols, terms and abbreviations have the indicated meanings.

Elastomer A denotes the reaction product of Resin A and Isocyanate A, and has a 75° F. modulus of 125,000 psi at a thickness of 0.125 inch and a specific gravity of 1.0.

Elastomer B denotes the reaction product of Resin H and Isocyanate A, and has a 75° F. modulus of 120,000 psi at a thickness of 0.125 inch and a specific gravity of 1.0.

Elastomer C denotes the reaction product of Resin F and Isocyanate A, and has a 75° F. modulus of 120,000 psi at a thickness of 0.125 inch and a specific gravity of 1.0.

Elastomer D denotes the reaction product of Resin F and isocyanate C, and has a 75° F. modulus of 115,000 psi at a thickness of 0.125 inch and a specific gravity of 1.0.

Elastomer E denotes Baydur 724, commercially available from Mobay Chemical Company.

Elastomer F denotes the reaction product of Resin E and Isocyanate B, and has a 75° F. modulus of 210,000 psi at a thickness of 0.250 and a specific gravity of 1.0.

Elastomer G denotes the reaction product of Resin G and Isocyanate B, and has a 75° F. modulus of 170,000 at a thickness of 0.250 inch and a specific gravity of 1.0.

Resin A denotes a blend of 70 wt.% of a 20% total solids polyacrylonitrile polymer/polyol having a hydroxyl number of 27 and 30 wt.% of a diol having a hydroxyl number of 1180.

Resin B denotes a blend of 71 wt.% of a 20% total solids polyacrylonitrile polymer/polyol having a hydroxyl number of 27 and 29 wt.% of 1,4-butanediol.

Resin C denotes a blend of 80 wt.% of a 20% total solids polyacrylonitrile polymer/polyol having a hydroxyl number of 27 and 10 wt.% ethylene glycol and 10 wt.% glycerine.

Resin D denotes a blend of 70 wt.% of a 20% total solids polyacrylonitrile polymer/polyol having a hydroxyl number of 27, 15 wt.% ethylene glycol and 15 wt.% of a propoxylated sucrose having a hydroxyl number of 490.

Resin E denotes a blend of 72 wt.% of a 20% total solids polyacrylonitrile polymer/polyol having a hydroxyl number of 27 and 28 wt.% ethylene glycol.

Resin F denotes a blend of 80 wt.% of a 20% total solids polyacrylonitrile polymer/polyol having a hydroxyl number of 27 and 20 wt.% ethylene glycol.

Resin G denotes a blend of 75 wt.% of a 20% total solids polyacrylonitrile polymer/polyol having a hydroxyl number of 27 and 25 wt.% ethylene glycol.

Resin H denotes a blend of 67 wt.% of a 16% total solids polyacrylonitrile polymer/polyol having a hydroxyl number of 37 and 33 wt.% of a diol having an hydroxyl number of 1250.

Resin I denotes a blend of 70 wt.% of a 20% total solids polyacrylonitrile polymer/polyol having a hydroxyl number of 27 and 30 wt.% ethylene glycol.

Isocyanate A denotes a 2.3 functional polymeric MDI.

Isocyanate B denotes a 2.8 functional polymeric MDI.

Isocyanate C denotes a 2.1 functional modified MDI.

Flame Retardant A denotes tris(dichloropropyl)phosphate.

Flame Retardant B denotes a phosphorus-chlorine-containing oligomer which contains 14 wt.% phosphorus and 26 wt.% chlorine and is available from Stauffer Chemical Co. as Fryol 99.

Flame Retardant C denotes tris(chloroethyl)phosphonate.

Flame Retardant D denotes a chlorinated phosphonate ester containing 11 wt.% phosphorus and 35 wt.% chlorine and is commercially available from Monsanto Chemical Company as Phosgard 2XC-20.

Flame Retardant E denotes tetrakis(2-chloroethyl)ethylene diphosphate.

Flame Retardant F denotes 2,3-dibromopropanol.

Flame Retardant G denotes an alkylhalogen-free ester of phosphorus acid having the formula:

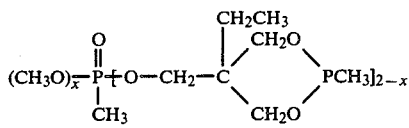

where x=0 or 1

Flame Retardant H denotes tris(betachloroethyl phosphate).

Flame Retardant I denotes tris(betachloropropyl)phosphate.

Filler A denotes wollastonite.

Filler B denotes 1/16" hammer milled glass fiber.

Filler C denotes fine particle alumina trihydrate commercially available from Solem Industries, Inc. as SB-331.

Filler D denotes coarse particle alumina trihydrate commercially available from Solem Industries, Inc. as Hydral 710.

Catalyst A denotes dibutyltin dilaurate.

FR denotes flame retardant.

Unless otherwise indicated, in all formuations the amount of the components is set forth in weight percent.

Vertical Burn Test

Vertical burn tests were conducted according to methods similar to the Underwriter's Laboratories, Inc. vertical burn test for polymeric materials. Test specimens 5.0 inches long by 0.50 inch wide by various thickness up to 0.50 inch were suspended vertically under controlled test conditions and exposed to a Bunsen burner flame for ten seconds. When flaming of the specimen ceased, the flame was immediately placed again under the specimen for an additional ten seconds. The duration of flaming and glowing was noted following each ten second ignition. Five specimens were tested for the evaluation.

Sample Plaque Preparation

In the examples that follow, test plaques were manufactured by hand or by machine. Plaques measuring 8"×8" were prepared by the bench mixing/hand casting techniques; plaques measuring 25"×50" were prepared by machine. Test results for the two types of plaques did not vary.

A. Bench Mixing/Hand Casting

Unless otherwise indicated, hand-cast plaques were prepared according to the following procedure.

A 500 ml, 4-necked, round-bottom reaction flask equipped with a mechanical stirrer, vacuum inlet, and thermometer was charged with a mixture of extender polyol and a chain extender such as 1,4-butanediol in the desired weight ratios, and a tin catalyst, such as dibutyltin dilaurate. The flask was then degassed under reduced pressure with stirring for approximately 20 minutes. The required amount of isocyanate reagent was then charged to the flask, and the contents were vigorously stirred under vacuum for at least 15 seconds. The vacuum was then broken on the reaction flask, and the liquid system was rapidly poured into a mold comprising two aluminum plates, measuring 8"×8" each, one of which contains a cavity of the desired depth. The plates were coated with a mold release compound. After the liquid system was poured into the mold, the mold was securely clamped around its perimeter using spring clamps and placed into an oven at 100° C. overnight. The plaques were demolded and tested for their physical properties.

In those experiments where fluorocarbon was used in the formulation, the vacuum degassing steps outlined above were eliminated.

B. Machine Casting

The machine-made samples were produced in steel plaque molds on RIM equipment. Unfilled elastomers were prepared on Admiral HP-90 equipment while reinforced elastomers were prepared on a Cincinnati Millicron R-15 machine. Examples 32, 35, 39 and 4 were molded in evaporative cooler housing molds using Canon RIM equipment.

EXAMPLES 1 THROUGH 40

Examples 1–38 illustrate the flammability characteristics of various high modulus elastomers using isocyanates with various average functionalities. Burn test results on Elastomer E, Examples 39 and 40, are included for purpose of comparison. The elastomers of Examples 1–6, 9–14 and 24–40 were hand-cast, all others were machine made. Elastomer C in Example, 23, Elastomer D in Examples 27–29, Elastomer G in Examples 32–38, and Elastomer E in Example 40 were all molded at a specific gravity of less than 1.0. The elastomers prepared and the burn results are set forth in Table I.

TABLE I

| | | | | | | | | | | Example No. | | | | | | | | | | |
|---|---|---|---|---|---|---|---|---|---|---|---|---|---|---|---|---|---|---|---|---|
| | | 1 | 2 | 3 | 4 | 5 | 6 | 7 | 8 | 9 | 10 | 11 | 12 | 13 | 14 | 15 | 16 | 17 | 18 | 19 | 20 |
| Thickness, In. | | .075 | .125 | .125 | .125 | .125 | .125 | .125 | .125 | .150 | .150 | .200 | .125 | .125 | .125 | .125 | .125 | .125 | .125 | .125 | .125 |
| Approx. Density, pcf | | 65 | 65 | 65 | 65 | 65 | 65 | 62 | 62 | 65 | 65 | 65 | 62 | 62 | 65 | 62 | 62 | 62 | 56 | 62 | 62 |
| Elastomer type | | A | A | A | A | A | A | A | A | A | A | A | B | B | C | C | C | C | C | C | C |
| Isocyanate functionality | | 2.3 | 2.3 | 2.3 | 2.3 | 2.3 | 2.3 | 2.3 | 2.3 | 2.3 | 2.3 | 2.3 | 2.3 | 2.3 | 2.3 | 2.3 | 2.3 | 2.3 | 2.3 | 2.3 | 2.3 |
| Vertical Burn Test | | | | | | | | | | | | | | | | | | | | | |
| Burn Time, Sec | | | | | | | | | | | | | | | | | | | | | |
| 1st Ignition | Specimen 1 | 27 | 30 | 11 | 14 | 9 | 5 | 7 | 17 | 97 | 18 | 14 | 70 | 3 | 52 | 25 | 92 | 74 | 62 | 16 | 18 |
| | 2 | 30 | 38 | 12 | 30 | 7 | 10 | 6 | 36 | 69 | 8 | 17 | 40 | 3 | 54 | 44 | 79 | 72 | 41 | 12 | 19 |
| | 3 | 41 | 8 | 10 | 11 | 18 | 9 | 65 | 30 | 41 | 16 | 10 | 7 | 10 | 60 | 42 | 66 | 66 | 30 | 16 | 18 |
| | 4 | 29 | 65 | 27 | 26 | 10 | 11 | 9 | 30 | 12 | 65 | 14 | 74 | 26 | 54 | 33 | 66 | 73 | 17 | 14 | 16 |
| | 5 | 33 | 48 | 35 | 6 | 11 | 9 | 74 | 30 | 14 | 157 | 11 | 19 | 6 | 57 | 46 | 66 | 69 | 18 | 15 | 15 |
| 2nd Ignition | Specimen 1 | 0 | 17 | — | 24 | 13 | 49 | 7 | 23 | 0 | 87 | 17 | 0 | 8 | 0 | 64 | 0 | 0 | 0 | 11 | 16 |
| | 2 | 0 | 16 | — | 22 | 6 | 45 | 5 | 26 | 21 | 29 | 111 | 0 | 7 | 0 | 23 | 0 | 0 | 19 | 16 | 28 |
| | 3 | 0 | 73 | — | 28 | 21 | 63 | 0 | 23 | 21 | 27 | 97 | 12 | 2 | 0 | 26 | 0 | 0 | 6 | 18 | 14 |
| | 4 | 0 | 15 | — | 20 | 43 | 51 | 4 | 22 | 18 | 0 | 108 | 0 | 7 | 0 | 24 | 0 | 0 | 16 | 10 | 7 |
| | 5 | 0 | 36 | — | 15 | 13 | 36 | 0 | 80 | 20 | 0 | 63 | 7 | 5 | 0 | 39 | 10 | 0 | 8 | 20 | 20 |
| Specimens dripped | | Yes | Yes | Yes | Yes | Yes | Yes | Yes | Yes | Yes | Yes | Yes | Yes | Yes | Yes | Yes | Yes | Yes | Yes | Yes | Yes |
| Specimens burned to clip | | Yes | Yes | — | No | No | Yes | No/Yes* | No/Yes | Yes | Yes/No* | No | No | Yes | Yes | Yes | No | Yes | Yes/No* | No | No |
| Total burn time, sec, 10 IG | | 160 | 346 | — | 196 | 151 | 288 | 177 | 317 | 292 | 407 | 462 | 229 | 77 | 277 | 366 | 379 | 354 | 217 | 148 | 171 |

| | | | | | | | | | | Example No. | | | | | | | | | | |
|---|---|---|---|---|---|---|---|---|---|---|---|---|---|---|---|---|---|---|---|---|
| | | 21 | 22 | 23 | 24 | 25 | 26 | 27 | 28 | 29 | 30 | 31 | 32 | 33 | 34 | 35 | 36 | 37 | 38 | 39 | 40 |
| Thickness, In. | | .375 | .375 | .375 | .125 | .125 | .250 | .250 | .250 | .250 | .125 | .125 | .125 | .250 | .250 | .250 | .250 | .500 | .500 | .125 | .250 |
| Approx. Density, pcf | | 59 | 63 | 46 | 62 | 62 | 61 | 53 | 49 | 42 | 62 | 55 | 45 | 62 | 60 | 45 | 39 | 52 | 41 | 53 | 45 |
| Elastomer type | | C | C | C | D | D | D | D | D | D | G | G | G | G | G | G | G | G | G | E | E |
| Isocyanate functionality | | 2.3 | 2.3 | 2.3 | 2.1 | 2.1 | 2.1 | 2.1 | 2.1 | 2.1 | 2.8 | 2.8 | 2.8 | 2.8 | 2.8 | 2.8 | 2.8 | 2.8 | 2.8 | — | — |
| Vertical Burn Test | | | | | | | | | | | | | | | | | | | | | |
| Burn Time, Sec | | | | | | | | | | | | | | | | | | | | | |
| 1st Ignition | Specimen 1 | 68 | 64 | 62 | 13 | 14 | 2 | 5 | 4 | 2 | 101 | 78 | 75 | 162 | 214 | 91 | 86 | 154 | 145 | 15 | 3 |
| | 2 | 69 | 67 | 59 | 14 | 12 | 1 | 1 | 5 | 2 | 100 | 82 | 67 | 187 | 190 | 73 | 64 | 174 | 146 | 21 | 18 |
| | 3 | 65 | 68 | 80 | 12 | 13 | 2 | 3 | 4 | 3 | 109 | 76 | 88 | 149 | 125 | 55 | 95 | 151 | 147 | 30 | 2 |
| | 4 | | 78 | 59 | 15 | 16 | 2 | 4 | 4 | 2 | 112 | 69 | 61 | 224 | 185 | 105 | 83 | 164 | 137 | 6 | 11 |
| | 5 | | 60 | 65 | 15 | 14 | 2 | 2 | 3 | 3 | 104 | 86 | 89 | 182 | 145 | 82 | 106 | 186 | 120 | 1 | 14 |
| 2nd Ignition | Specimen 1 | 16 | 35 | 9 | 16 | 14 | 7 | 5 | 3 | 1 | 0 | 0 | 0 | 0 | 0 | 0 | 0 | 4 | 0 | 26 | 29 |
| | 2 | 2 | 90 | 71 | 12 | 17 | 5 | 1 | 2 | 2 | 0 | 2 | 2 | 0 | 0 | 1 | 0 | 3 | 34 | 7 | 2 |
| | 3 | 90 | 50 | 29 | 14 | 15 | 5 | 3 | 1 | 2 | 5 | 2 | 2 | 2 | 0 | 4 | 0 | 1 | 0 | 3 | 11 |
| | 4 | | 43 | 22 | 16 | 12 | 5 | 1 | 2 | 2 | 0 | 2 | 8 | 0 | 0 | 3 | 0 | 9 | 0 | 32 | 25 |
| | 5 | | 30 | 10 | 14 | 12 | 4 | 2 | 4 | 2 | 0 | 0 | 2 | 0 | 0 | 0 | 0 | 0 | 0 | 2 | 2 |
| Specimens dripped | | Yes | Yes | Yes | Yes | Yes | Yes | Yes | Yes | Yes | No | No | No | No | No | No | No | No | No | No | No |
| Specimens burned to clip | | Yes | Yes | Yes | No | No | No | No | No | No | Yes | Yes | Yes | Yes | Yes | No | Yes | No | Yes | No | No |
| Total burn time, sec, 10 IG | | 516 Est. | 585 | 466 | 141 | 140 | 35 | 23 | 33 | 21 | 531 | 400 | 394 | 905 | 859 | 414 | 434 | 908 | 729 | 143 | 117 |

*Indicates that at least one, but not all of the specimens burned to the clip.

Elastomers prepared using isocyanates of low average functionality tended to drip flaming particles (Examples 1 through 29) while elastomers prepared using isocyanates of high average functionality did not (Examples 30 through 38). At the same time, elastomers prepared from lower average functionality isocyanates had lower average burn times than elastomers prepared using intermediate or higher average isocyanate functionalities. The elastomers of Examples 24 through 29 were self-extinguishing. By contrast the elastomers of most other Examples burned to the holding clip. The fact that the low isocyanate functionality-based elastomers tended to be self-extinguishing while the higher isocyanate functionality-based elastomers were not appears to be related to the dripping property of the low isocyanate functionality-based elastomers. This dripping property provides the mechanism through which self-extinguishment can occur by the dripping of the flame away from the elastomer. Higher isocyanate functionality-based elastomers have a slower rate of burning but, without flame retardant additives will not self-extinguish.

EXAMPLES 41 THROUGH 48

These examples further illustrate the effect of the use of a higher average functionality isocyanate in the preparation of a high modulus elastomer in order to impart non-dripping characteristics to the elastomer. The elastomers were prepared by hand. The resin and isocyanate employed and the burn properties of the resulting elastomer are set forth in Table II.

It can be seen from these examples that the elastomers with higher crosslink density possess the non-dripping characteristics, whether the increased crosslinking results from the use of a high functionality isocyanate (Examples 42 and 44), or from the use of a high functionality (i.e., greater than 2) extender (Examples 45 and 47) or from the use of both (Examples 46 and 48). The use of the high functionality isocyanate has the further advantage that burn times tend to increase (i.e., burn rate decreases) as a comparison of Examples 45, 46, 47, and 48 with Examples 41 and 42 illustrates.

It is also believed that the use of a higher average functionality isocyanate to increase the crosslink density of the elastomer would be more desirable because it would be expected that the use of higher functionality chain extenders would adversely affect elastomer physical properties, such as elongation and impact resistance; that is, these elastomer physical properties would be lower than desired.

EXAMPLES 49 THROUGH 63

These examples illustrate the inability of the flame retardant additive alone to impart non-dripping characteristics to a conventional high modulus polyurethane elastomer prepared using a low functionality isocyanate. Various flame retardant additives and concentrations were utilized and other additives were incorporated. Elastomer C in Examples 62 and 63 was molded at a specific gravity of less than 1.0. The various additives and the like, including the burn results are set forth in Table III.

TABLE II

| | | Example No. | | | | | | | |
|---|---|---|---|---|---|---|---|---|---|
| | | 41 | 42 | 43 | 44 | 45 | 46 | 47 | 48 |
| Thickness, In. | | .125 | .125 | .125 | .125 | .125 | .125 | .125 | .125 |
| Approx. Density, pcf | | 65 | 65 | 65 | 65 | 65 | 65 | 65 | 65 |
| Elastomer type | | A | A | B | B | C* | C* | D** | D** |
| Isocyanate, type | | A | B | A | B | A | B | A | B |
| Isocyanate, functionality | | 2.3 | 2.8 | 2.3 | 2.8 | 2.3 | 2.8 | 2.3 | 2.8 |
| Vertical Burn Test | | | | | | | | | |
| Burn Time, Sec | | | | | | | | | |
| 1st Specimen | 1 | 98 | 124 | 75 | 155 | 104 | 147 | 90 | 165 |
| Ignition | 2 | 96 | 144 | 83 | 158 | 98 | 147 | 101 | 172 |
| | 3 | 98 | 121 | 80 | 157 | 101 | 146 | 99 | 184 |
| | 4 | 96 | 125 | 79 | 159 | 99 | 147 | 100 | 182 |
| | 5 | 86 | 130 | 77 | 156 | 96 | 148 | 99 | 170 |
| 2nd Specimen | 1 | 0 | 0 | 0 | 0 | 0 | 0 | 0 | 0 |
| Ignition | 2 | 0 | 0 | 0 | 0 | 0 | 0 | 0 | 0 |
| | 3 | 0 | 0 | 0 | 0 | 0 | 0 | 0 | 0 |
| | 4 | 0 | 0 | 0 | 0 | 0 | 0 | 0 | 0 |
| | 5 | 0 | 0 | 0 | 0 | 0 | 0 | 0 | 0 |
| Specimens dripped | | Yes | No | Yes | No | No | No | No | No |
| Specimens burned to clip | | Yes | Yes | Yes | Yes | Yes | Yes | Yes | Yes |
| Total burn time, sec, 10 IG | | 474 | 644 | 394 | 785 | 498 | 735 | 489 | 873 |

*Chain extender includes glycerine.
**Chain extender includes a propoxylated sucrose having a hydroxyl number of 4%.

TABLE III

| | | Example No. | | | | | | | | | | | | | | |
|---|---|---|---|---|---|---|---|---|---|---|---|---|---|---|---|---|
| | | 49 | 50 | 51 | 52 | 53 | 54 | 55 | 56 | 57 | 58 | 59 | 60 | 61 | 62 | 63 |
| Elastomer Type | | A | A | A | A | A | A | A | A | A | A | A | A | A | C | C |
| Thickness, In. | | .125 | .125 | .125 | .125 | .125 | .125 | .125 | .125 | .125 | .125 | .125 | .125 | .125 | .250 | .250 |
| Approx. Density, pcf | | 65 | 65 | 65 | 65 | 65 | 65 | 65 | 65 | 65 | 65 | 65 | 65 | 65 | 47 | 47 |
| Flame Retardant Type | | Control | A | A | B | B | C | C | D | D | E | E | F | F | Control | G |
| WT % in Elastomer | | 0.0 | 5.7 | 10.0 | 5.7 | 10.0 | 5.7 | 10.0 | 5.7 | 10.0 | 5.7 | 10.0 | 5.7 | 10.0 | 0.0 | 4.8 |
| Vertical Burn Test | | | | | | | | | | | | | | | | |
| Burn Time, Sec | | | | | | | | | | | | | | | | |
| 1st Specimen | 1 | 10 | 16 | 67 | 89 | 63 | 24 | 2 | 49 | 55 | 85 | 61 | 21 | 34 | 28 | 136 |
| Ignition | 2 | 17 | 19 | 81 | 62 | 59 | 25 | 3 | 56 | 53 | 64 | 57 | 28 | 29 | 57 | 175 |
| | 3 | 16 | 47 | 75 | 104 | 65 | 25 | 2 | 60 | 54 | 82 | 64 | 48 | 31 | 37 | 130 |
| | 4 | 23 | 62 | 116 | 88 | 64 | 17 | 2 | 52 | 49 | 80 | 74 | 31 | 30 | 87 | 143 |
| | 5 | 15 | 20 | 118 | 89 | 60 | 18 | 3 | 61 | 56 | 70 | 66 | 38 | 27 | 53 | 131 |

TABLE III-continued

| | | Example No. | | | | | | | | | | | | | | |
|---|---|---|---|---|---|---|---|---|---|---|---|---|---|---|---|---|
| | | 49 | 50 | 51 | 52 | 53 | 54 | 55 | 56 | 57 | 58 | 59 | 60 | 61 | 62 | 63 |
| 2nd Specimen | 1 | 29 | 32 | 0 | 0 | 0 | 18 | 30 | 0 | 0 | 0 | 0 | 14 | 11 | 17 | 0 |
| Ignition | 2 | 24 | 76 | 0 | 0 | 0 | 2 | 38 | 0 | 0 | 0 | 0 | 21 | 7 | 90 | 5 |
| | 3 | 45 | 0 | 0 | 0 | 0 | 73 | 33 | 4 | 0 | 0 | 0 | 70 | 20 | 90 | 0 |
| | 4 | 38 | 0 | 0 | 0 | 0 | 0 | 10 | 0 | 0 | 0 | 0 | 16 | 15 | 2 | 0 |
| | 5 | 21 | 22 | 0 | 0 | 0 | 16 | 8 | 8 | 0 | 0 | 0 | 34 | 10 | 33 | 0 |
| Specimens dripped | | Yes | Yes | Yes | Yes | Yes | Yes | Yes | Yes | Yes | Yes | Yes | Yes | Yes | Yes | Yes |
| Specimens burned to holding clamp | | Yes | Yes/No* | Yes | Yes | Yes | No | No | Yes | Yes | Yes | Yes | Yes | No | Yes | Yes |
| Total burn time, sec, 10 IG | | 238 | 294 | 457 | 432 | 311 | 218 | 131 | 290 | 267 | 381 | 322 | 321 | 214 | 494 | 720 |

*Indicates that at least one, but not all of the specimens burned to the clip.

EXAMPLES 64 THROUGH 141

In this set of examples, hand-made plaques of Elastomer F were prepared according to the bench-mix technique. Various phosphorus-chlorine flame retardant compounds at loadings ranging from 0 to 10 or 20% (by weight) were used. Plaques were also prepared which contained 15% (by weight) Filler B (Examples 96–119) and 5% (by weight) of a 50/50 blend of Fillers C and D (Examples 120–141). All plaques were 0.250 inch thick and plaque densities ranged from 57 to 69 pounds per cubic foot. The particular flame retardant used and burn data are set forth in Table IV.

TABLE IV

| | | | | | | | | | | | | | Example No. | | | | | | | | | | | | | |
|---|---|---|---|---|---|---|---|---|---|---|---|---|---|---|---|---|---|---|---|---|---|---|---|---|---|---|
| | 64 | 65 | 66 | 67 | 68 | 69 | 70 | 71 | 72 | 73 | 74 | 75 | 76 | 77 | 78 | 79 | 80 | 81 | 82 | 83 | 84 | 85 | 86 | 87 | 88 | 89 |
| Formulation | | | | | | | | | | | | | | | | | | | | | | | | | | |
| Resin E | 42.78 | 42.35 | 41.92 | 41.50 | 41.07 | 40.64 | 39.57 | 38.50 | 42.35 | 41.92 | 41.50 | 41.07 | 40.64 | 39.57 | 38.50 | 42.35 | 41.92 | 41.50 | 41.07 | 40.64 | 39.57 | 38.50 | 36.36 | 34.22 | 42.35 | 41.92 |
| Catalyst A | .021 | .021 | .021 | .021 | .021 | .020 | .020 | .019 | .021 | .021 | .021 | .021 | .020 | .020 | .019 | .021 | .021 | .021 | .021 | .020 | .020 | .019 | .018 | .017 | .021 | .021 |
| Filler B | | | | | | | | | | | | | | | | | | | | | | | | | | |
| Fillers C & D | | | | | | | | | | | | | | | | | | | | | | | | | | |
| Isocyanate B | 56.65 | 56.08 | 55.52 | 54.94 | 54.38 | 53.82 | 52.40 | 50.98 | 56.08 | 55.52 | 54.94 | 54.38 | 53.82 | 52.40 | 50.98 | 54.08 | 55.52 | 54.94 | 54.38 | 53.82 | 52.40 | 50.98 | 48.15 | 45.32 | 56.08 | 55.52 |
| Fluorocarbon-11 | .57 | .57 | .56 | .56 | .55 | .54 | .53 | .52 | .57 | .56 | .56 | .55 | .54 | .53 | .52 | .57 | .56 | .56 | .55 | .54 | .53 | .52 | .49 | .46 | .57 | .56 |
| FR additive, Type | Control | E | E | E | E | E | E | E | H | H | H | H | H | H | H | C | C | C | C | C | C | C | C | C | D | D |
| FR additive, Wt. % | 0.0 | 1.0 | 2.0 | 3.0 | 4.0 | 5.0 | 7.5 | 10.0 | 1.0 | 2.0 | 3.0 | 4.0 | 5.0 | 7.5 | 10.0 | 1.0 | 2.0 | 3.0 | 4.0 | 5.0 | 7.5 | 10.0 | 15.0 | 20.0 | 1.0 | 2.0 |
| Processing | | | | | | | | | | | | | | | | | | | | | | | | | | |
| Resin Temp, °F. | 75 | 75 | 75 | 75 | 75 | 75 | 75 | 75 | 75 | 75 | 75 | 75 | 75 | 75 | 75 | 75 | 75 | 75 | 75 | 75 | 75 | 75 | 75 | 75 | 75 | 75 |
| Iso temp, °F. | 75 | 75 | 75 | 75 | 75 | 75 | 75 | 75 | 75 | 75 | 75 | 75 | 75 | 75 | 75 | 75 | 75 | 75 | 75 | 75 | 75 | 75 | 75 | 75 | 75 | 75 |
| Mold temp, °F. | 120 | 120 | 120 | 120 | 120 | 120 | 120 | 120 | 120 | 120 | 120 | 120 | 120 | 120 | 120 | 120 | 120 | 120 | 120 | 120 | 120 | 120 | 120 | 120 | 120 | 120 |
| Demold time, min | 5 | 5 | 5 | 5 | 5 | 5 | 5 | 5 | 5 | 5 | 5 | 5 | 5 | 5 | 5 | 5 | 5 | 5 | 5 | 5 | 5 | 5 | 5 | 5 | 5 | 5 |
| Post-cure days | 5 | 5 | 5 | 5 | 5 | 5 | 5 | 5 | 5 | 5 | 5 | 5 | 5 | 5 | 5 | 5 | 5 | 5 | 5 | 5 | 5 | 5 | 5 | 5 | 5 | 5 |
| Oven cure, hr/°F. | — | — | — | — | — | — | — | — | — | — | — | — | — | — | — | — | — | — | — | — | — | — | — | — | — | — |
| Plaque Properties (8 in. × 8 in. × t) | | | | | | | | | | | | | | | | | | | | | | | | | | |
| Nominal thickness, in. | .250 | .250 | .250 | .250 | .250 | .250 | .250 | .250 | .250 | .250 | .250 | .250 | .250 | .250 | .250 | .250 | .250 | .250 | .250 | .250 | .250 | .250 | .250 | .250 | .250 | .250 |
| Overall density, pcf | 62 | 63 | 64 | 65 | 64 | 64 | 64 | 65 | 64 | 64 | 61 | 64 | 66 | 65 | 63 | 64 | 64 | 63 | 64 | 63 | 64 | 64 | 65 | 57 | 62 | 65 |
| Vertical Burn Test | | | | | | | | | | | | | | | | | | | | | | | | | | |
| Burn Time, Sec | | | | | | | | | | | | | | | | | | | | | | | | | | |
| 1st Ignition Specimen 1 | 192 | 16 | 4 | 2 | 7 | 258 | 74 | 81 | 50 | 9 | 7 | 3 | 5 | 4 | 9 | 108 | 13 | 5 | 2 | 1 | 2 | 0 | 0 | 0 | 87 | 9 |
| 2 | 216 | 19 | 7 | 12 | 30 | 252 | 227 | 81 | 23 | 6 | 6 | 2 | 1 | 2 | 4 | 72 | 13 | 8 | 3 | 1 | 0 | 0 | 1 | 0 | 32 | 16 |
| 3 | 217 | 76 | 7 | 4 | 137 | 253 | 91 | 84 | 32 | 6 | 8 | 5 | 3 | 2 | 1 | 82 | 21 | 7 | 3 | 1 | 1 | 1 | 2 | 1 | 29 | 36 |
| 4 | 209 | 17 | 9 | 2 | 40 | 222 | 98 | 72 | 51 | 4 | 3 | 3 | 1 | 1 | 1 | 83 | 22 | 4 | 4 | 3 | 1 | 1 | 0 | 0 | 28 | 16 |
| 5 | 199 | 20 | 9 | 3 | 35 | 223 | 90 | 66 | 29 | 2 | 3 | 3 | 2 | 1 | 1 | 48 | 17 | 7 | 4 | 5 | 3 | 1 | 1 | 1 | 10 | 3 |
| 2nd Ignition Specimen 1 | 0 | 101 | 10 | 107 | 282 | 0 | 0 | 197 | 21 | 4 | 13 | 5 | 11 | 80 | 80 | 0 | 16 | 12 | 10 | 2 | 6 | 7 | 5 | 1 | 3 | 9 |
| 2 | 0 | 10 | 10 | 46 | 213 | 0 | 0 | 27 | 1 | 2 | 16 | 312 | 126 | 18 | 70 | 0 | 23 | 3 | 0 | 5 | 3 | 55 | 11 | 0 | 44 | 50 |
| 3 | 0 | 3 | 14 | 310 | 0 | 0 | 0 | 10 | 9 | 4 | 1 | 136 | 32 | 283 | 80 | 0 | 6 | 2 | 6 | 2 | 3 | 1 | 0 | 1 | 2 | 4 |
| 4 | 29 | 4 | 184 | 225 | 0 | 203 | 34 | 8 | 2 | 16 | 6 | 29 | 275 | 3 | 20 | 76 | 3 | 33 | 29 | 49 | 21 | 55 | 1 | 6 | 28 | 28 |
| 5 | 0 | 6 | 99 | 199 | 1208 | 580 | 29 | 6 | 15 | 283 | 6 | 66 | 2 | 55 | 4 | 313 | 2 | 0 | 0 | 21 | 116 | 11 | 0 | 5 | 0 | 0 |
| Total burn time, sec | 1033 | 292 | 71 | 769 | 1168 | 0 | 1208 | 855 | 253 | 47 | 87 | 757 | 216 | 732 | 251 | 448 | 313 | 53 | 33 | 29 | 49 | 116 | 11 | 6 | 323 | 176 |
| No. specimens dripped | 0 | 0 | 0 | 0 | 0 | 1 | 580 | 0 | 0 | 0 | 0 | 0 | 0 | 0 | 0 | 0 | 0 | 0 | 0 | 0 | 0 | 0 | 0 | 0 | 0 | 0 |
| No. specimens burned to clip | 5 | 0 | 0 | 1 | 5 | 5 | 1 | 2 | 0 | 0 | 0 | 2 | 0 | 2 | 0 | 0 | 0 | 0 | 0 | 0 | 0 | 0 | 0 | 0 | 1 | 0 |

| | | | | | | | | | | | | Example No. | | | | | | | | | | | | | | |
|---|---|---|---|---|---|---|---|---|---|---|---|---|---|---|---|---|---|---|---|---|---|---|---|---|---|---|
| | 90 | 91 | 92 | 93 | 94 | 95 | 96 | 97 | 98 | 99 | 100 | 101 | 102 | 103 | 104 | 105 | 106 | 107 | 108 | 109 | 110 | 111 | 112 | 113 | 114 | 115 |
| Formulation | | | | | | | | | | | | | | | | | | | | | | | | | | |
| Resin E | 41.50 | 41.07 | 40.64 | 39.57 | 38.50 | 36.36 | 36.35 | 36.00 | 35.64 | 35.27 | 34.91 | 34.54 | 33.63 | 32.73 | 36.00 | 35.64 | 35.27 | 34.91 | 34.54 | 33.63 | 32.73 | 30.91 | 36.00 | 35.64 | 35.29 | 34.91 |
| Catalyst A | .021 | .021 | .020 | .020 | .019 | .018 | .018 | .018 | .018 | .018 | .018 | .017 | .017 | .016 | .018 | .018 | .018 | .018 | .017 | .017 | .016 | .016 | .018 | .018 | .018 | .018 |
| Filler B | | | | | | | 15.0 | 15.0 | 15.0 | 15.0 | 15.0 | 15.0 | 15.0 | 15.0 | 15.0 | 15.0 | 15.0 | 15.0 | 15.0 | 15.0 | 15.0 | 15.0 | 15 | 15 | 15 | 15 |
| Fillers C & D | | | | | | | | | | | | | | | | | | | | | | | | | | |
| Isocyanate B | 54.94 | 54.38 | 53.82 | 52.40 | 50.98 | 48.15 | 48.15 | 47.67 | 47.18 | 46.71 | 46.22 | 45.75 | 44.54 | 43.33 | 47.67 | 47.18 | 46.71 | 46.22 | 45.75 | 44.54 | 43.33 | 40.93 | 47.67 | 47.18 | 46.71 | 46.22 |
| Fluorocarbon-11 | .56 | .55 | .54 | .53 | .52 | .49 | .49 | .46 | .48 | .47 | .47 | .46 | .45 | .44 | .48 | .48 | .47 | .47 | .46 | .45 | .44 | .41 | .48 | .48 | .47 | .47 |
| FR additive, Type | D | D | D | D | D | D | Control | H | H | H | H | H | H | H | E | E | E | E | E | E | E | E | C | C | C | C |
| FR additive, Wt. % | 3.0 | 4.0 | 5.0 | 7.5 | 10.0 | 15.0 | 0.0 | 0.85 | 1.70 | 2.55 | 3.40 | 4.25 | 6.38 | 8.50 | 0.85 | 1.70 | 2.55 | 3.40 | 4.25 | 6.38 | 8.50 | 12.75 | 0.85 | 1.70 | 2.55 | 3.40 |
| Processing | | | | | | | | | | | | | | | | | | | | | | | | | | |
| Resin Temp, °F. | 75 | 75 | 75 | 75 | 75 | 75 | 75 | 75 | 75 | 75 | 75 | 75 | 75 | 75 | 75 | 75 | 75 | 75 | 75 | 75 | 75 | 75 | 75 | 75 | 75 | 75 |

TABLE IV-continued

| | 116 | 117 | 118 | 119 | 120 | 121 | 122 | 123 | 124 | 125 | 126 | 127 | 128 |
|---|---|---|---|---|---|---|---|---|---|---|---|---|---|
| Iso temp, °F. | 75 | 75 | 75 | 75 | 75 | 75 | 75 | 75 | 75 | 75 | 75 | 75 | 75 |
| Mold temp, °F. | 120 | 120 | 120 | 120 | 120 | 120 | 120 | 120 | 120 | 120 | 120 | 120 | 120 |
| Demold time, min | 5 | 5 | 5 | 5 | 5 | 5 | 5 | 5 | 5 | 5 | 5 | 5 | 5 |
| Post-cure days | 5 | 5 | 5 | 5 | 5 | 5 | 5 | 5 | 5 | 5 | 5 | 5 | 5 |
| Oven cure, hr/°F. | — | — | — | — | — | — | — | — | — | — | — | — | — |
| Plaque Properties (8 in. × 8 in. × t) | | | | | | | | | | | | | |
| Nominal thickness, in. | .250 | .250 | .250 | .250 | .250 | .250 | .250 | .250 | .250 | .250 | .250 | .250 | .250 |
| Overall density, pcf | 64 | 64 | 63 | 63 | 61 | 66 | 62 | 64 | 65 | 65 | 66 | 64 | 69 |
| Vertical Burn Test | | | | | | | | | | | | | |
| Burn Time, Sec | | | | | | | | | | | | | |
| 1st Ignition — Specimen 1 | 16 | 34 | 14 | 83 | 76 | 212 | 62 | 56 | 82 | 160 | 90 | 4 | 0 |
| 2 | 7 | 3 | 22 | 80 | 64 | 226 | 70 | 109 | 39 | 156 | 236 | 3 | 0 |
| 3 | 42 | 11 | 18 | 85 | 73 | 216 | 81 | 96 | 46 | 67 | 123 | 3 | 0 |
| 4 | 27 | 36 | 25 | 83 | 181 | 211 | | 105 | 98 | 170 | 215 | 6 | 0 |
| 5 | 44 | 3 | 9 | | 184 | 222 | | 58 | 71 | 58 | 240 | 5 | 0 |
| 2nd Ignition — Specimen 1 | 79 | 63 | 98 | 0 | 0 | 0 | | 0 | 0 | 0 | 0 | 240 | 88 |
| 2 | 8 | 45 | 5 | 0 | 1 | 0 | | 0 | 4 | 0 | 0 | 223 | 84 |
| 3 | 4 | 226 | 91 | 0 | 52 | 166 | | 0 | 0 | 166 | 0 | 218 | 55 |
| 4 | 5 | 141 | 67 | 0 | 59 | 0 | | 0 | 0 | 0 | 0 | 232 | 74 |
| 5 | 34 | 234 | 13 | 0 | 11 | 155 | | 0 | 0 | 0 | 0 | 220 | 69 |
| Total burn time, sec | 266 | 796 | 362 | 411 | 578 | 1087 | 214 | 424 | 340 | 932 | 904 | 1160 | 370 |
| No. specimens dripped | 0 | 0 | 0 | 0 | 2 | 0 | 0 | 0 | 0 | 2 | 0 | 0 | 5 |
| No. specimens burned to clip | 0 | 2 | 0 | 0 | 0 | 5 | | 0 | 0 | 0 | 3 | 5 | 0 |

| | 129 | 130 | 131 | 132 | 133 | 134 | 135 | 136 | 137 | 138 | 139 | 140 | 141 |
|---|---|---|---|---|---|---|---|---|---|---|---|---|---|
| Formulation | | | | | | | | | | | | | |
| Resin E | 33.54 | 33.20 | 32.86 | 32.51 | 31.66 | 30.80 | 33.88 | 34.54 | 33.20 | 32.86 | 32.51 | 31.66 | 30.80 |
| Catalyst A | .017 | .017 | .016 | .016 | .016 | .015 | .017 | .017 | .017 | .016 | .016 | .016 | .015 |
| Filler B | 15 | 15 | 15 | 15 | 15 | 15 | 15 | 15 | 15 | 15 | 15 | 15 | 15 |
| Fillers C & D | 5 | 5 | 5 | 5 | 5 | 5 | 5 | 5 | 5 | 5 | 5 | 5 | 5 |
| Isocyanate B | 44.41 | 43.96 | 43.50 | 43.05 | 41.92 | 40.79 | 44.87 | 44.41 | 43.96 | 43.50 | 43.05 | 41.92 | 40.79 |
| Fluorocarbon-11 | .45 | .44 | .44 | .44 | .42 | .41 | .45 | .45 | .44 | .44 | .44 | .42 | .41 |
| FR additive, Type | H | H | H | H | H | H | C | C | C | C | C | C | C |
| FR additive, Wt. % | 1.60 | 2.40 | 3.20 | 4.00 | 6.00 | 8.00 | 0.80 | 1.60 | 2.40 | 3.20 | 4.00 | 6.00 | 8.00 |
| Processing | | | | | | | | | | | | | |
| Resin Temp, °F. | 75 | 75 | 75 | 75 | 75 | 75 | 75 | 75 | 75 | 75 | 75 | 75 | 75 |
| Iso temp, °F. | 75 | 75 | 75 | 75 | 75 | 75 | 75 | 75 | 75 | 75 | 75 | 75 | 75 |
| Mold temp, °F. | 120 | 120 | 120 | 120 | 120 | 120 | 120 | 120 | 120 | 120 | 120 | 120 | 120 |
| Demold time, min | 5 | 5 | 5 | 5 | 5 | 5 | 5 | 5 | 5 | 5 | 5 | 5 | 5 |
| Post-cure days | 5 | 5 | 5 | 5 | 5 | 5 | 5 | 5 | 5 | 5 | 5 | 5 | 5 |
| Oven cure, hr/°F. | — | — | — | — | — | — | — | — | — | — | — | — | — |
| Plaque Properties (8 in. × 8 in. × t) | | | | | | | | | | | | | |
| Nominal thickness, in. | .250 | .250 | .250 | .250 | .250 | .250 | .250 | .250 | .250 | .250 | .250 | .250 | .250 |
| Overall density, pcf | 62 | 63 | 64 | 64 | 64 | 65 | 62 | 63 | 63 | 65 | 64 | 64 | 65 |
| Vertical Burn Test | | | | | | | | | | | | | |
| Burn Time, Sec | | | | | | | | | | | | | |
| 1st Ignition — Specimen 1 | 84 | 27 | 3 | 1 | 1 | 1 | 116 | 170 | 14 | 1 | 1 | 1 | 1 |
| 2 | 46 | 24 | 9 | 1 | 1 | 1 | 147 | 97 | 10 | 1 | 1 | 1 | 1 |
| 3 | 75 | 15 | 134 | 22 | 1 | 1 | 106 | 289 | 104 | 5 | 1 | 1 | 1 |

TABLE IV-continued

| 2nd Ignition | | | | | | | | | | | | | | | | | | | | | | | | | | |
|---|---|---|---|---|---|---|---|---|---|---|---|---|---|---|---|---|---|---|---|---|---|---|---|---|---|---|
| Specimen | | | | | | | | | | | | | | | | | | | | | | | | | | |
| 4 | 1 | — | — | — | — | — | — | 106 | 7 | 2 | — | 87 | 85 | 21 | 10 | 1 | — | — | — | — | 16 | 3 | — | — | — | — |
| 5 | 3 | — | — | — | — | — | — | 27 | 4 | 10 | — | 79 | 79 | 145 | 2 | 17 | — | — | — | — | 23 | — | — | — | — | — |
| 1 | 78 | 261 | 88 | — | 195 | 50 | 48 | 118 | — | 175 | 21 | 83 | 0 | 0 | 154 | 199 | 155 | 80 | 66 | 139 | 110 | 39 | 8 | 8 | 6 | 78 |
| 2 | 94 | 136 | 7 | 1 | 176 | 98 | 57 | 188 | — | 149 | 86 | 93 | 0 | 66 | 69 | 277 | 140 | 103 | 65 | 168 | 100 | 53 | 9 | 3 | 4 | 84 |
| 3 | 11 | 112 | 9 | — | 0 | 0 | 0 | 0 | 0 | 120 | 115 | 95 | 0 | 73 | 171 | 0 | 128 | 94 | 67 | 0 | 0 | 0 | 12 | 117 | 6 | 18 |
| 4 | 25 | 13 | 5 | 1 | 0 | 81 | 0 | 176 | 0 | 107 | 58 | 3 | 0 | 0 | 96 | 190 | 110 | 98 | 16 | 0 | 0 | 3 | 90 | 1 | 7 | 81 |
| 5 | 82 | 6 | 13 | 9 | 0 | 22 | 0 | 0 | 64 | 111 | 99 | 10 | 0 | 0 | 0 | 106 | 157 | 94 | 72 | 0 | 0 | 1 | 8 | 5 | 7 | 267 |
| Total burn time, sec | 297 | 536 | 129 | 20 | 880 | 412 | 318 | 984 | 588 | 712 | 412 | 289 | 448 | 508 | 722 | 930 | 732 | 474 | 291 | 676 | 766 | 263 | 138 | 139 | 35 | 0 |
| No. specimens dripped | 0 | 0 | 0 | 0 | 0 | 0 | 0 | 0 | 0 | 0 | 0 | 0 | 0 | 0 | 0 | 0 | 0 | 0 | 0 | 2 | 2 | 0 | 0 | 0 | 0 | 0 |
| No. specimens burned to clip | 0 | 1 | 0 | 0 | 0 | 5 | 0 | 0 | 1 | 0 | 1 | 0 | 0 | 0 | 0 | 1 | 0 | 0 | 0 | 2 | 2 | 0 | 1 | 0 | 0 | 0 |

The examples illustrate the modal minimum for Flame Retardant E, Flame Retardant H, Flame Retardant D and Flame Retardant C. Thus, for Flame Retardant E the modal minimum concentration is from about 1.5 to 2.5 wt. %, as seen in Examples 65 through 67. For Flame Retardant H, the modal minimum concentration is from about 1.5 to 3.5 wt. %, as seen in Examples 72 through 74. For Flame Retardant D, the modal minimum concentration is from about 1.5 to 3.5 wt. %, as seen in Examples 88 through 90. And for Flame Retardant C, the modal minimum concentration is from about 3 to 9 wt. %, as seen in Examples 81 through 84.

The examples also indicate that the presence of 15% (by weight) milled glass generally worsen the burn test results of compositions containing Flame Retardants C, E and H. (Examples 96-119). The effect of added glass filler is to change the modal minimum flame retardant concentration to a higher flame retardant loading as can be seen by a comparison of Examples 96 through 103 with Examples 72-79, Examples 104 through 111 with Examples 64-71 and Examples 112 through 119 with Examples 80-87. Moreover, while some improvement in burn time was observed at very low levels of flame retardant, the modal minimum was observed at somewhat higher flame retardant loadings.

Examples 120 through 141 illustrate that 5% (by weight) of a 50/50 blend of Fillers C and D improves overall burn performance of the glass-filled elastomers.

EXAMPLES 142 THROUGH 149

In this set of examples, plaques of Elastomer F were prepared on a Cincinnati-Milacron R-15 Reaction Injection Molding Machine at various loadings with Flame Retardant C. The burn data are set forth in Table V.

TABLE V

| | | 142 | 143 | 144 | 145 | 146 | 147 | 148 | 149 |
|---|---|---|---|---|---|---|---|---|---|
| Formulation | | | | | | | | | |
| Resin Type | | E | E | E | E | E | E | I | I |
| Amount | | 41.62 | 40.12 | 40.33 | 40.08 | 39.83 | 39.83 | 38.27 | 37.25 |
| Catalyst A | | .031 | .030 | .036 | .036 | .036 | .036 | .134 | .034 |
| Brown Pigment | | | | | | | | | 1.55 |
| Isocyanate B | | 57.21 | 58.68 | 58.50 | 58.76 | 59.02 | 59.02 | 60.55 | 60.02 |
| Fluorocarbon-11 | | 1.17 | 1.20 | 1.17 | 1.16 | 1.15 | 1.15 | 1.18 | 1.18 |
| FR additive, Type | | Control | C | C | C | C | C | C | C |
| FR additive, Wt. % | | 0.0 | 3.5 | 4.1 | 4.7 | 5.3 | 5.3 | 5.4 | 5.4 |
| Processing | | | | | | | | | |
| Resin Temp, °F. | | 130 | 130 | 130 | 130 | 130 | 130 | 130 | 130 |
| Iso Temp, °F. | | 75 | 75 | 75 | 75 | 75 | 75 | 75 | 75 |
| Mold Temp, °F. | | 150 | 150 | 140 | 140 | 140 | 140 | 150 | 150 |
| Demold Time, min | | 3 | 3 | 3 | 3 | 3 | 3 | 3 | 4 |
| Post-cure days | | 2 | 1 | 1 | 2 | 7 | 7 | 3 | 7 |
| Oven cure, hr/°F. | | — | — | — | — | 1/250 | — | — | — |
| Plaque Properties (25 in. × 50 in. × t) | | | | | | | | | |
| Nominal thickness, in. | | .250 | .250 | .250 | .250 | .250 | .250 | .250 | |
| Overall density, pcf | | 61 | 60 | 60 | 60 | 53 | 56 | 60 | |
| Plaque Properties (25 in. × 50 in. × 5) | | | | | | | | | |
| Nominal thickness | | | | | | | | | .250 |
| Overall density, pcf | | | | | | | | | 60 |
| Vertical Burn Test Burn Time, Sec | | | | | | | | | |
| 1st Specimen | 1 | 256 | 60 | 5 | 7 | 6 | 1 | 1 | 4 |
| Ignition | 2 | 252 | 15 | 9 | 3 | 1 | 1 | 4 | 5 |
| | 3 | 231 | 66 | 7 | 3 | 1 | 3 | 1 | 6 |
| | 4 | 234 | 38 | 18 | 13 | 7 | 1 | 1 | 5 |
| | 5 | 228 | 79 | 44 | 2 | 1 | 1 | 1 | 1 |
| 2nd Specimen | 1 | 0 | 8 | 6 | 24 | 4 | 6 | 2 | 7 |
| Ignition | 2 | 0 | 100 | 4 | 29 | 15 | 10 | 4 | 6 |
| | 3 | 0 | 21 | 44 | 53 | 4 | 2 | 2 | 6 |
| | 4 | 0 | 9 | 69 | 5 | 4 | 4 | 2 | 4 |
| | 5 | 0 | 5 | 21 | 73 | 4 | 1 | 4 | 3 |
| Total burn time, sec | | 1201 | 401 | 227 | 212 | 47 | 30 | 22 | 47 |
| Specimens dripped | | 0 | 0 | 0 | 0 | 0 | 0 | 0 | 0 |
| Specimens burned to clip | | | 5 | 0 | 0 | 0 | 0 | 0 | 0 |

Physical properties for the elastomers prepared in Examples 142, 145 and 149 are set forth in Table Va below.

TABLE Va

| | Example No. | | |
|---|---|---|---|
| | 142 | 145 | 149 |
| Tensile Strength, psi | 4200 | 4000 | 4000 |
| Flexural Modulus, M psi @ 75° F. | 216 | 197 | 204 |
| Flexural Modulus, M psi @ 158° F. | 100 | 64 | 90 |
| Notched Izod Impact, ft./lbs./in. | 1.3 | 1.5 | — |

The burn data indicate that an addition of 5.3% (by weight) Flame Retardant C provided optimum vertical burn test behavior. It was also found that the formulation could be further optimized by increasing the chain extender in the resin to compensate for the placticizing effect of the flame retardant.

EXAMPLES 150 THROUGH 159

These examples illustrate the effect on burn time of various loadings of Flame Retardant H in Elastomer F. Plaque thickness was the same for each plaque and likewise plaque density was very similar, ranging from 58/66 pounds per cubic foot. The burn data is set forth in Table VI.

tardant H in Elastomer F. It can be seen that optimum burn performance was obtained at a flame retardant loading of 2% (by weight) for the machine-made plaques (Examples 154-159) and at a flame retardant loading of from 2.4 to about 3.6% by weight (Examples 150 and 153 for the hand-made plaques made by the bench-mix techniques). Burn performance of the sample plaques were generally good for both the hand and

TABLE VI

| | | 150 | 151 | 152 | 153 | 154 | 155 | 156 | 157 | 158 | 159 |
|---|---|---|---|---|---|---|---|---|---|---|---|
| Formulation | | | | | | | | | | | |
| Resin E | | 41.5 | 41.0 | 40.5 | 38.4 | 42.56 | 42.16 | 41.72 | 41.31 | 40.88 | 40.44 |
| Catalyst A | | .017 | .016 | .016 | .015 | .032 | .038 | .038 | .037 | .037 | .036 |
| Isocyanate Type | | B | B | B | B | B | B | B | B | B | B |
| Isocyanate Functionality | | 2.8 | 2.8 | 2.8 | 2.8 | 2.8 | 2.8 | 2.8 | 2.8 | 2.8 | 2.8 |
| Isocyanate, Wt. % | | 56.1 | 55.4 | 54.7 | 52.0 | 56.26 | 55.66 | 55.12 | 54.53 | 54.00 | 53.43 |
| Fluorocarbon-11 | | | | | | 1.15 | 1.14 | 1.12 | 1.12 | 1.10 | 1.09 |
| FR additive, type | | H | H | H | H | Control | H | H | H | H | H |
| FR additive | | 2.4 | 3.6 | 4.8 | 9.6 | 0.0 | 1.0 | 2.0 | 3.0 | 4.0 | 5.0 |
| Processing | | | | | | | | | | | |
| Resin Temp, °F. | | 75 | 75 | 75 | 75 | 120 | 120 | 120 | 120 | 120 | 120 |
| Iso Temp, °F. | | 75 | 75 | 75 | 75 | 75 | 75 | 75 | 75 | 75 | 75 |
| Mold Temp, °F. | | 120 | 120 | 120 | 120 | 150 | 150 | 150 | 150 | 150 | 150 |
| Demold Time, min | | 5 | 5 | 5 | 5 | 6 | 4 | 4 | 4 | 4 | 4 |
| Post-cure, days | | 5 | 5 | 5 | 5 | 7 | 7 | 7 | 7 | 7 | 7 |
| Oven-cure, hr/°F. | | — | — | — | — | — | — | — | — | — | — |
| Plaque Properties (8 in. × 8 in. × t) | | | | | | | | | | | |
| Nominal thickness, in. | | .250 | .250 | .250 | .250 | | | | | | |
| Overall density, pcf | | 66 | 66 | 66 | 66 | | | | | | |
| Plaque Properties (25 in. × 50 in. × t) | | | | | | | | | | | |
| Nominal thickness, in. | | | | | | .250 | .250 | .250 | .250 | 250 | 250 |
| Overall density, pcf | | | | | | 59 | 60 | 59 | 58 | 59 | 58 |
| Vertical Burn Test | | | | | | | | | | | |
| Burn Time, Sec | | | | | | | | | | | |
| 1st Specimen | 1 | 4 | 2 | 2 | 0 | 224 | 24 | 3 | 4 | 5 | 322 |
| Ignition | 2 | 1 | 1 | 1 | 0 | 230 | 29 | 10 | 5 | 34 | 42 |
| | 3 | 4 | 1 | 1 | 0 | 218 | 48 | 11 | 34 | 4 | 267 |
| | 4 | 1 | 1 | 1 | 1 | 223 | 51 | 23 | 10 | 47 | 283 |
| | 5 | 3 | 1 | 1 | 0 | 243 | 110 | 19 | 18 | 54 | 255 |
| 2nd Specimen | 1 | 3 | 1 | 9 | 1 | 0 | 5 | 12 | 113 | 94 | 0 |
| | 2 | 3 | 10 | 93 | 54 | 0 | 3 | 23 | 109 | 165 | 90 |
| | 3 | 2 | 1 | 50 | 49 | 0 | 4 | 35 | 94 | 94 | 0 |
| | 4 | 1 | 6 | 39 | 49 | 0 | 12 | 15 | 131 | 117 | 0 |
| | 5 | 3 | 1 | 20 | 34 | 0 | 4 | 78 | 137 | 0 | |
| Total burn time, sec | | 27 | 25 | 217 | 188 | 1138 | 286 | 155 | 596 | 751 | 1259 |
| Specimens dripped | | 0 | 0 | 0 | 0 | 0 | 0 | 0 | 0 | 0 | 0 |
| Specimens burned to clip | | 0 | 0 | 0 | 0 | 5 | 0 | 0 | 0 | 0 | 4 |

Physical properties of the elastomers prepared in Examples 154-159 are set forth in Table VIa below.

TABLE VIa

| | Example No. | | | | | |
|---|---|---|---|---|---|---|
| | 154 | 155 | 156 | 157 | 158 | 159 |
| Tensile Strength, psi | 3600 | 4200 | 3700 | 4100 | 4200 | 3900 |
| Flexural Modulus, M psi @ 75° F. | 169 | 172 | 171 | 164 | 168 | 162 |
| Flexural Modulus, M psi @ 158° F. | 106 | 92 | 87 | 83 | 87 | 80 |
| Notched Izod Impact, ft./lbs./in. | 1.0 | 1.1 | 1.1 | 1.1 | 1.3 | 1.2 |

These examples indicate the existence of the modal minimum flame retardant concentration for Flame Remachine-made plaques. For the hand-made plaques, burn performance met the criteria for even the most stringent requirement, however, for machine-made plaques, it did not meet the criteria for the most stringent requirement.

The physical properties in Table VIa demonstrate the reduction in high temperature modulus observed on adding flame retardant.

EXAMPLES 160 THROUGH 170

These Examples illustrate the use of Flame Retardant H in Elastomer E with plaques of various thicknesses. The plaque thickness, flame retardant loading, and burn test results in a vertical burn test are set forth in Table VII.

TABLE VII

| | Example No. | | | | | | | | | | |
|---|---|---|---|---|---|---|---|---|---|---|---|
| | 160 | 161 | 162 | 163 | 164 | 165 | 166 | 167 | 168 | 169 | 170 |
| Formulation | | | | | | | | | | | |
| Resin E | 41.99 | 41.99 | 40.72 | 40.72 | 42.23 | 42.23 | 38.84* | 38.84* | 38.84* | 37.73* | 35.98* |
| Catalyst A | .042 | .042 | .041 | .041 | .032 | .032 | .029 | .029 | .029 | .038 | .054 |

TABLE VII-continued

| | | Example No. | | | | | | | | | | |
|---|---|---|---|---|---|---|---|---|---|---|---|---|
| | | 160 | 161 | 162 | 163 | 164 | 165 | 166 | 167 | 168 | 169 | 170 |
| Isocyanate Type | | B | B | B | B | B | B | B | B | B | B | B |
| Isocyanate Functionality | | 2.8 | 2.8 | 2.8 | 2.8 | 2.8 | 2.8 | 2.8 | 2.8 | 2.8 | 2.8 | 2.8 |
| Isocyanate, Wt. % | | 55.65 | 55.65 | 51.47 | 51.47 | 49.90 | 56.04 | 56.04 | 53.23 | 53.23 | 53.23 | 51.20 |
| Fluorocarbon-11 | | 2.32 | 2.32 | 2.14 | 2.14 | 1.73 | 1.73 | 1.83 | 1.83 | 1.83 | 1.87 | 1.92 |
| FR additive, Type | | Control | Control | H | H | Control | Control | H | H | | | |
| FR additive, Wt. % | | 0.0 | 0.0 | 5.6 | 5.6 | 0.0 | 0.0 | 6.1 | 6.1 | | | |
| FR additive, I.D. | | | | | | | | | | H | H | H |
| FR additive | | | | | | | | | | 6.1 | 9.2 | 12.2 |
| Processing | | | | | | | | | | | | |
| Resin Temp, °F. | | 130 | 130 | 130 | 130 | 120 | 120 | 120 | 120 | 120 | 120 | 120 |
| Iso temp, °F. | | 75 | 75 | 75 | 75 | 85 | 85 | 85 | 85 | 85 | 85 | 85 |
| Mold temp, °F. | | 140 | 140 | 140 | 140 | 140 | 160 | 140 | 150 | 160 | 140 | 150 |
| Demold time, min | | 3 | 3 | 3 | 3 | 3 | 2 | 3 | 2 | 2 | 3 | 3 |
| Post-cure, days | | 7 | 7 | 7 | 7 | 7 | 7 | 7 | 7 | 7 | 7 | 7 |
| Oven cure, hr/°F. | | — | — | — | — | — | — | — | — | — | — | — |
| Plaque Properties (25 in. × 50 in. × t) | | | | | | | | | | | | |
| Nominal thickness, in. | | .500 | .250 | .500 | .250 | .500 | .125 | .500 | .250 | .125 | .500 | .150 |
| Overall density, pcf | | 47 | 45 | 46 | 45 | 56 | 60 | 58 | 56 | 59 | 56 | 58 |
| Vertical Burn Test | | | | | | | | | | | | |
| Burn Time, Sec | | | | | | | | | | | | |
| 1st Specimen | 1 | 233 | 134 | 20 | 44 | 73 | 110 | 1 | 1 | 138 | 0 | 1 |
| Ignition | 2 | 92 | 100 | 21 | 40 | 69 | 123 | 1 | 2 | 128 | 0 | 1 |
| | 3 | 74 | 125 | 20 | 43 | 83 | 119 | 0 | 1 | 100 | 1 | 1 |
| | 4 | 74 | 127 | 22 | 7 | 66 | 116 | 2 | 1 | 135 | 1 | 1 |
| | 5 | 86 | 113 | 24 | 42 | 100 | 90 | 1 | 1 | 6 | 2 | 1 |
| 2nd Specimen | 1 | 0 | 0 | 0 | 0 | 16 | 0 | 4 | 213 | 0 | 3 | 7 |
| Ignition | 2 | 0 | 0 | 0 | 0 | 19 | 0 | 3 | 33 | 0 | 3 | 1 |
| | 3 | 0 | 0 | 0 | 0 | 6 | 0 | 17 | 20 | 0 | 3 | 1 |
| | 4 | 0 | 0 | 0 | 34 | 10 | 0 | 3 | 68 | 0 | 3 | 3 |
| | 5 | 0 | 0 | 0 | 0 | 6 | 0 | 3 | 2 | 116 | 3 | 3 |
| Total burn time, sec | | 559 | 599 | 107 | 210 | 448 | 558 | 35 | 342 | 623 | 19 | 20 |
| No. specimens dripped | | 0 | 0 | 0 | 0 | 0 | 0 | 0 | 0 | 0 | 0 | 0 |
| No. specimens burned to clip | | 0 | 5 | 0 | 0 | 0 | 5 | 0 | 0 | 5 | 0 | 0 |

*Added chain extender, 1.5 phr in resin, in these formulations.

The physical properties of the elastomers prepared in Examples 160–170 are set forth in Table VIIa.

TABLE VIIa

| | Elastomer Physical Properties | | | | | | | | | | |
|---|---|---|---|---|---|---|---|---|---|---|---|
| | Example No. | | | | | | | | | | |
| | 160 | 161 | 162 | 163 | 164 | 165 | 166 | 167 | 168 | 169 | 170 |
| Tensile Strength, psi | 3000 | 2700 | 2600 | 2200 | 2700 | 4400 | 3800 | 3800 | 4100 | 3500 | 3500 |
| Flexural Modulus, M psi @ 75° F. | 131 | 134 | 92 | 118 | 160 | 220 | 178 | 182 | 215 | 170 | 163 |
| Flexural Modulus, M psi @ 158° F. | 72 | 71 | 53 | 53 | 81 | 131 | 77 | 96 | 86 | 63 | 97 |
| Notched Isod Impact, ft./lbs./in | 1.1 | 0.8 | 0.9 | 1.0 | 1.3 | 1.5 | 1.5 | 1.3 | 1.3 | 1.5 | 1.6 |

The data illustrate the effect of specimen thickness on burn time. Generally the thicker the specimen cross section the better are the burn characteristics. Moreover, it can be seen that higher levels of flame retardant may be required with samples of reduced thickness. The data in Table VIIa demonstrates the loss in high temperature modulus at relatively high loadings of flame retardant even with added chain extender as can be seen from a comparison of Examples 165 and Example 170, and Examples 164 and 169.

EXAMPLES 171–187

These Examples illustrate the use of various flame retardant additives and fillers in Elastomer F. In examples 171–184, various amounts of a 50/50 (by weight) blend of Fillers C and D were incorporated into the elastomer, with and without the use of Flame Retardant H. In Examples 185–187, Filler B was added to a formulation which included the filler blend used in Examples 171–184 and Flame Retardant H.

The elastomer formulation, processing conditions, plaque density and thickness and burn data for each Example are set forth in Table VIII.

TABLE VIII

| | Example No. | | | | | | | | |
|---|---|---|---|---|---|---|---|---|---|
| | 171 | 172 | 173 | 174 | 175 | 176 | 177 | 178 | 179 |
| Formulation | | | | | | | | | |
| Resin E | 33.47 | 33.47 | 31.64 | 31.64 | 42.5 | 36.3 | 38.3 | 34.2 | 36.2 |
| Catalyst A | .027 | .027 | .025 | .025 | .017 | .015 | .015 | .014 | .015 |
| Filler B | | | | | | | | | |
| Fillers C & D | 20.0 | 20.0 | 20.0 | 20.0 | 0.0 | 5.0 | 5.0 | 10.0 | 10.0 |

TABLE VIII-continued

| Isocyanate Type | B | B | B | B | B | B | B | B | B |
|---|---|---|---|---|---|---|---|---|---|
| Isocyanate Functionality | 2.8 | 2.8 | 2.8 | 2.8 | 2.8 | 2.8 | 2.8 | 2.8 | 2.8 |
| Isocyanate, Wt. % | 44.67 | 44.67 | 41.63 | 41.63 | 57.5 | 49.1 | 51.9 | 46.2 | 49.0 |
| Fluorocarbon-11 | 1.86 | 1.86 | 1.93 | 1.93 | | | | | |
| FR additive, Type | — | — | H | H | Control | H | H | H | H |
| FR additive, Wt. % | — | — | 4.8 | 4.8 | 0.0 | 9.6 | 4.8 | 9.6 | 4.8 |
| Processing | | | | | | | | | |
| Resin Temp, °F. | 130 | 130 | 130 | 130 | 75 | 75 | 75 | 75 | 75 |
| Iso temp, °F. | 75 | 75 | 75 | 75 | 75 | 75 | 75 | 75 | 75 |
| Mold temp, °F. | 160 | 150 | 160 | 150 | 120 | 120 | 120 | 120 | 120 |
| Demold time, min | 3 | 5 | 3 | 5 | 5 | 5 | 5 | 5 | 5 |
| Post-cure, days | 7 | 7 | 7 | 7 | 5 | 5 | 5 | 5 | 5 |
| Oven cure, hr/°F. | — | — | — | — | — | — | — | — | — |
| Plaque Properties (25 in. × 50 in. × t) | | | | | | | | | |
| Nominal thickness, in. | .250 | .500 | .250 | .500 | | | | | |
| Overall density, pcf | 71 | 66 | 63 | 64 | | | | | |
| Plaque Properties (8 in. × 8 in. × t) | | | | | | | | | |
| Nominal thickness, in. | | | | | .250 | .250 | .250 | .250 | .250 |
| Overall density, pcf | | | | | 64 | 63 | 65 | 63 | 61 |
| Vertical Burn Test | | | | | | | | | |
| Burn Time, Sec | | | | | | | | | |
| 1st Ignition Specimen 1 | 47 | 38 | 3 | 0 | 224 | 0 | 4 | 0 | 0 |
| 2 | 132 | 44 | 1 | 0 | 200 | 0 | 0 | 0 | 0 |
| 3 | 44 | 28 | 1 | 0 | 192 | 0 | 2 | 0 | 0 |
| 4 | 62 | 39 | — | — | 131 | 0 | 0 | 0 | 0 |
| 5 | — | 43 | — | — | 102 | 0 | 1 | 0 | 0 |
| 2nd Ignition Specimen 1 | 52 | 31 | 14 | 0 | 0 | 1 | 45 | 2 | 5 |
| 2 | 0 | 10 | 5 | 0 | 0 | 0 | 6 | 0 | 2 |
| 3 | 77 | 17 | 2 | 0 | 0 | 1 | 3 | 0 | 4 |
| 4 | 64 | 5 | — | — | 128 | 0 | 26 | 0 | 1 |
| 5 | — | 34 | — | — | 133 | 2 | 5 | 0 | 0 |
| Total burn time, sec | 598* | 264 | 43* | 0* | 1105 | 4 | 92 | 2 | 15 |
| No. specimens dripped | 0 | 0 | 0 | 0 | 0 | 0 | 0 | 0 | 0 |
| No. specimens burned to clip | 0 | 0 | 0 | 0 | 5 | 0 | 0 | 0 | 0 |

| | | Example No. | | | | | | | |
|---|---|---|---|---|---|---|---|---|---|
| | | 180 | 181 | 182 | 183 | 184 | 185 | 186 | 187 |
| Formulation | | | | | | | | | |
| Resin E | | 37.2 | 32.0 | 33.0 | 29.8 | 27.6 | 31.29 | 31.29 | 31.29 |
| Catalyst A | | .015 | .013 | .013 | .012 | .011 | .028 | .028 | .028 |
| Filler B | | | | | | | 9.19 | 9.19 | 9.19 |
| Fillers C & D | | 10.0 | 20.0 | 20.0 | 30.0 | 35.0 | 10.0 | 10.0 | 10.0 |
| Isocyanate Type | | B | B | B | B | B | B | B | B |
| Isocyanate Functionality | | 2.8 | 2.8 | 2.8 | 2.8 | 2.8 | 2.8 | 2.8 | 2.8 |
| Isocyanate, Wt. % | | 50.4 | 43.2 | 44.6 | 40.2 | 37.4 | 42.56 | 42.56 | 42.56 |
| Flourocarbon-11 | | | | | | | 1.98 | 1.98 | 1.98 |
| FR additive, Type | | H | H | H | H | H | H | H | H |
| FR additive, Wt. % | | 2.4 | 4.8 | 2.4 | 0.0 | 0.0 | 4.95 | 4.95 | 4.95 |
| Processing | | | | | | | | | |
| Resin Temp, °F. | | 75 | 75 | 75 | 75 | 75 | 130 | 130 | 130 |
| Iso temp, °F. | | 75 | 75 | 75 | 75 | 75 | 78 | 78 | 78 |
| Mold temp, °F. | | 120 | 120 | 120 | 120 | 120 | 150 | 150 | 150 |
| Demold time, min | | 5 | 5 | 5 | 5 | 5 | 4 | 4 | 4 |
| Post-cure, days | | 5 | 5 | 5 | 5 | 5 | 7 | 7 | 7 |
| Oven cure, hr/°F. | | — | — | — | — | — | — | — | — |
| Plaque Properties (25 in. × 50 in. × t) | | | | | | | | | |
| Nominal thickness, in. | | | | | | | .250 | .190 | .125 |
| Overall density, pcf | | | | | | | 58 | 58 | 56 |
| Plaque Properties (8 in. × 8 in. × t) | | | | | | | | | |
| Nominal thickness, in. | | .250 | .250 | .250 | .250 | .250 | | | |
| Overall density, pcf | | 58 | 59 | 61 | 57 | 61 | | | |
| Vertical Burn Test | | | | | | | | | |
| Burn Time, Sec | | | | | | | | | |
| 1st Ignition Specimen 1 | | 14 | 0 | 0 | 0 | 0 | 0 | 0 | 0 |
| 2 | | 22 | 0 | 0 | 1 | 0 | 0 | 0 | 1 |
| 3 | | 38 | 0 | 0 | 0 | 4 | 0 | 0 | 0 |
| 4 | | 14 | 0 | 0 | 1 | 0 | 0 | 1 | 0 |
| 5 | | 19 | 0 | 0 | 0 | 0 | 0 | 0 | 1 |
| 2nd Ignition Specimen 1 | | 22 | 15 | 0 | 15 | 7 | 1 | 59 | 108 |
| 2 | | 0 | 0 | 8 | 15 | 8 | 1 | 6 | 115 |
| 3 | | 32 | 0 | 0 | 67 | 8 | 9 | 54 | 138 |
| 4 | | 1 | 0 | 0 | 24 | 8 | 1 | 59 | 94 |
| 5 | | 3 | 0 | 7 | 28 | 4 | 1 | 64 | 108 |
| Total burn time, sec | | 165 | 15 | 15 | 151 | 39 | 13 | 252 | 563 |
| No. specimens dripped | | 0 | 0 | 0 | 0 | 0 | 0 | 0 | 0 |

TABLE VIII-continued

| | | | | | | | | |
|---|---|---|---|---|---|---|---|---|
| No. specimens burned to clip | 0 | 0 | 0 | 0 | 0 | 0 | 0 | 5 |

*Extrapolated to ten exposures

The physical properties of the elastomers prepared in Examples 171-174 are set forth in Table VIIa.

TABLE VIIIa

| Elastomer Physical Properties | | | | |
|---|---|---|---|---|
| | Example No. | | | |
| | 171 | 172 | 173 | 174 |
| Tensile Strength, psi | 3200 | 2700 | 2400 | 2700 |
| Flexural Modulus, M psi @ 75° F. | 243 | 208 | 186 | 185 |
| Flexural Modulus, M psi @ 158° F. | 129 | 92 | 84 | 55 |
| Notched Izod Impact, ft./lbs./in. | 0.7 | — | 0.4 | — |

It can be seen that elastomers having satisfactory burn characteristics can be achieved with a wide variety of fillers, flame retardants and combinations thereof. Illustrative are Examples 175-184 which tend to indicate that a combination of a blend of Fillers C and D and Flame Retardant H can be selected so as to confer on a polyurethane elastomer burn performance capable of meeting even the most stringent burn criteria. Similar burn performance can likewise be achieved for filled elastomers, as illustrated by Examples 185-187, although, as expected, burn performance worsened with reduced specimen thickness.

EXAMPLE 188

This example illustrates use of a mixture of flame retardant additives to impart combustion resistance to a high modulus polyurethane elastomer. Two flame retardants, G and I were used. The elastomer formulation, processing parameters, sample dimensions and burn data are set forth in Table IX.

TABLE IX

| | Example No. 188 | |
|---|---|---|
| Formulation | | |
| Resin I | 37.23 | |
| Catalyst A | 0.034 | |
| Isocyanate, Type | B | |
| Isocyanate, Functionality | 2.8 | |
| Isocyanate, Wt. % | 54.74 | |
| FR additive, mixture of | G, I | |
| Wt. % of each FR | 0.5, 4.7 | |
| Processing | | |
| Resin temp., °F. | 120 | |
| Isocyanate temp, °F. | 75 | |
| Mold temp, °F. | 150 | |
| Demold time, min | 4 | |
| Post-cure, days | 7 | |
| Oven cure, hr/°F. | None | |
| Plaque Properties (8 in. × 8 in. × t) | (duplicates) | |
| Nominal thickness, in | .250 | .250 |
| Overall density, pcf | 63 | 62 |
| Vertical Burn Test Burn Time, Sec. | | |
| 1st Specimen Ignition | 1 | 1 |
| | 2 6 | 3 |
| | 3 2 | 1 |
| | 4 1 | 2 |
| | 5 1 | 1 |
| 2nd Specimen Ignition | 1 2 | 2 |
| | 2 3 | 2 |
| | 3 3 | 2 |

TABLE IX-continued

| | Example No. 188 | |
|---|---|---|
| | 4 1 | 5 |
| | 5 2 | 1 |
| Total burn time, sec | 22 | 20 |
| No. specimens dripped | 0 | 0 |
| No. specimens burned to clip | 0 | 0 |

We claim:

1. A high modulus polyurethane elastomer having improved combustion resistance comprising the reaction product of a mixture comprising (a) a polyol having a hydroxyl number of from about 20 to about 60, (b) a low molecular weight chain extender, (c) a liquid organic polymeric isocyanate, said isocyanate having an average functionality of at least about 2.4, (d) a catalyst for the reaction of (a) and (b) with (c) and (e) a flame retardant reactant, the improvement which comprises, said flame retardant being present in an amount within the modal minimum concentration for said flame retardant.

2. The polyurethane elastomer of claim 1 wherein said chain extender has a molecular weight of less than about 200 grams/mole.

3. The polyurethane elastomer of claim 2 wherein said chain extender is a member selected from the group consisting of ethylene glycol and 1,4-butanediol.

4. The polyurethane elastomer of claim 1 wherein said isocyanate is polymethylene poly(phenylene)isocyanate.

5. The polyurethane elastomer of claim 4 wherein said isocyanate has an average functionality of at least 2.5.

6. The polyurethane elastomer of claim 4 wherein said isocyanate has an average functionality of at least 2.7.

7. The polyurethane elastomer of claim 4 wherein said isocyanate has an average functionality of 2.8.

8. The polyurethane elastomer of claim 1 wherein said flame retardant is a chlorine-containing phosphonate.

9. The polyurethane elastomer of claim 1 wherein said flame retardant is a chlorine-containing phosphate.

10. The polyurethane elastomer of claim 8 wherein said flame retardant is either tris(chloroethyl)phosphonate or a different chlorinated phosphonate ester containing 11 wt% phosphorus and 35 wt% chlorine.

11. The polyurethane elastomer of claim 9 wherein said flame retardant is a member selected from the group consisting of tetrakis(2-chloroethyl)ethylene diphosphate, and tris(chloroethyl)phosphate.

12. The polyurethane elastomer of claim 1 wherein said flame retardant is a mixture of a phosphorus compound of the formula

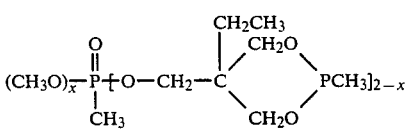

where x=0 or 1 and tris(betachloropropyl)phosphate.

13. The polyurethane elastomer of claim 1 wherein said elastomer includes a filler selected from the group consisting of alumina trihydrate and glass fiber.

14. The polyurethane elastomer of claim 1 wherein said elastomer has a modulus of at least about 100,000 psi.

15. The polyurethane elastomer of claim 1 wherein said elastomer has a modulus of at least about 160,000 psi.

16. The polyurethane elastomer of claim 1 wherein said elastomer has a modulus of from about 200,000 psi to about 240,000 psi.

17. The polyurethane elastomer of claim 14 prepared by reaction injection molding.

18. The polyurethane elastomer of claim 15 prepared by reaction injection molding.

19. The polyurethane elastomer of claim 16 prepared by reaction injection molding.

20. A high modulus polyurethane elastomer having improved combustion resistance comprising the reaction product of a mixture comprising (a) a normally liquid polymer/polyol composition consisting essentially of (1) from about 40 to about 95 weight percent of a polyol having a hydroxyl number of from about 20 to about 60 and (2) from about 60 to about 5 weight percent of a polymer formed from an ethylenically unsaturated monomer, said polymer being in the form of particles that are stably dispersed in the polyol and said composition having been produced by polymerizing said monomer in said polyol, (b) a low molecular weight chain extender, (c) a liquid organic polymeric isocyanate, said isocyanate having an average functionality of at least about 2.4, (d) a catalyst for the reaction of (a) and (b) with (c) and (e) a flame retardant, said flame retardant the improvement which comprises being present in an amount within the modal minimum concentration for said flame retardant.

21. The elastomer of claim 20 wherein the monomer is at least one member selected from the group consisting of acrylonitrile, styrene and methylmethacrylate.

22. The polyurethane elastomer of claim 20 wherein the chain extender has a molecular weight of less than about 200 grams/mole.

23. The polyurethane elastomer of claim 22 wherein said chain extender is a member selected from the group consisting of ethylene glycol and 1,4-butanediol.

24. The polyurethane elastomer of claim 20 wherein said isocyanate is polymethylene poly(phenylene)isocyanate.

25. The polyurethane elastomer of claim 24 wherein said isocyanate has an average functionality of at least 2.5.

26. The polyurethane elastomer of claim 24 wherein said isocyanate has an average functionality of at least 2.7.

27. The polyurethane elastomer of claim 24 wherein said isocyanate has an average functionality of 2.8.

28. The polyurethane elastomer of claim 20 wherein said flame retardant is either tris(chloroethyl)phosphonate or a different chlorinated phosphonate ester containing 11 wt.% phosphorus and 35 wt.% chlorine.

29. The polyurethane elastomer of claim 20 wherein said flame retardant is a chlorine-containing phosphate.

30. The polyurethane elastomer of claim 29 wherein said flame retardant is a member selected from the group consisting of tetrakis(2-chloroethyl)ethylene diphosphate, and tris(chloroethyl)phosphate.

31. The polyurethane elastomer of claim 20 wherein said flame retardant is a mixture of a phosphorus compound of the formula $$(CH_3O)_{\overline{x}}\overset{O}{\underset{CH_3}{\overset{\|}{P}}}{+}O{-}CH_2{-}C\underset{CH_2O}{\overset{CH_2O}{\diagup}}\hspace{-0.3em}\underset{\diagdown}{\overset{\diagup}{\diagdown}}PCH_3]_{2-x}$$

where x=0 or 1 and tris(betachloropropyl)phosphate.

32. The polyurethane elastomer of claim 20 wherein said elastomer includes a filler selected from the group consisting of alumina trihydrate and glass fiber.

33. The polyurethane elastomer of claim 20 wherein said elastomer has a modulus of at least about 100,000 psi.

34. The polyurethane elastomer of claim 20 wherein said elastomer has a modulus of at least about 160,000 psi.

35. The polyurethane elastomer of claim 20 wherein said elastomer has a modulus of from about 200,000 psi to about 240,000 psi.

36. The polyurethane elastomer of claim 33 prepared by reaction injection molding.

37. The polyurethane elastomer of claim 34 prepared by reaction injection molding.

38. The polyurethane elastomer of claim 35 prepared by reaction injection molding.

39. A process for preparing a high modulus polyurethane elastomer having improved combustion resistance comprising reacting (a) a normally liquid polymer/polyol composition consisting essentially of (1) from about 40 to about 95 weight percent of a polyol having a hydroxyl number of from about 20 to about 60 and (2) from about 60 to about 5 weight percent of a polymer formed from an ethylenically unsaturated monomer, said polymer being in the form of particles that are stably dispersed in the polyol and said composition having been produced by polymerizing said monomer in said polyol, (b) a low molecular weight chain extender, (c) a liquid organic polymeric isocyanate, said isocyanate having an average functionality of at least about 2.4, in the presence of (d) a catalyst for the reaction of (a) and (b) with (c) and in the presence of (e) a flame retardant, the improvement which comprises said flame retardant being present in an amount within the modal minimum concentration for said flame retardant.

40. The process of claim 39 wherein said chain extender has a molecular weight of less than about 200 grams/mole.

41. The process of claim 40 wherein said chain extender is a member selected from the group consisting of ethylene glycol and 1,4-butanediol.

42. The process of claim 39 wherein said isocyanate is polymethylene poly(phenylene)isocyanate.

43. The process of claim 42 wherein said isocyanate has an average functionality of at least 2.5.

44. The process of claim 42 wherein said isocyanate has an average functionality of 2.8.

45. The process of claim 39 wherein said flame retardant is a chlorine-containing phosphonate.

46. The process of claim 39 wherein said flame retardant is a chlorine-containing phosphate.

47. The process of claim 45 wherein said flame retardant is either tris(chloroethyl)phosphonate or a different chlorinated phosphonate ester containing 11 wt.% phorphorus and 35 wt.% chlorine.

48. The process of claim 46 wherein said flame retardant is a member selected from the group consisting of tetrakis(2-chloroethyl)ethylene diphosphate, and tris(-chloroethyl)phosphate.

49. The process of claim 39 wherein said flame retardant is a mixture of a phosphorus compound of the formula:

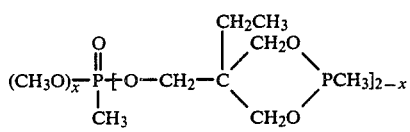

where x=0 or 1 and tris(betachloropropyl)phosphate.

50. The process of claim 39 wherein the reaction is carried out in the presence of a filler selected from the group consisting of alumina trihydrate and glass fiber.

51. The process of claim 39 wherein said reaction is carried out by reaction injection molding.

52. The process of claim 51 wherein said elastomer has a modulus of at least about 100,000 psi.

53. The process of claim 51 wherein said elastomer has a modulus of at least about 160,000 psi.

54. The process of claim 51 wherein said elastomer has a modulus of from about 200,000 to about 240,000 psi.

55. The polyurethane elastomer of claim 1 wherein said polyol is a poly(oxyalkylene)polyol.

56. The polyurethane elastomer of claim 1 wherein said polyol is an amine terminated poly(oxyalkylene)polyol.

57. The polyurethane elastomer of claim 20 wherein said polyol is a poly(oxyalkylene)polyol.

58. The polyurethane elastomer of claim 20 wherein said polyol is an amine terminated poly(oxyalkylene)polyol.

59. The process of claim 39 wherein said polyol is a poly(oxyalkylene)polyol.

60. The process of claim 39 wherein said polyol is an amine terminated poly(oxyalkylene)polyol.

* * * * *